(12) United States Patent
Cai

(10) Patent No.: US 8,369,301 B2
(45) Date of Patent: Feb. 5, 2013

(54) OFDM/OFDMA FRAME STRUCTURE FOR COMMUNICATION SYSTEMS

(75) Inventor: Sean Cai, San Diego, CA (US)

(73) Assignee: ZTE (USA) Inc., San Diego, CA (US)

( * ) Notice: Subject to any disclaimer, the term of this patent is extended or adjusted under 35 U.S.C. 154(b) by 934 days.

(21) Appl. No.: 12/253,878

(22) Filed: Oct. 17, 2008

(65) Prior Publication Data

US 2009/0122771 A1    May 14, 2009

Related U.S. Application Data

(60) Provisional application No. 60/980,760, filed on Oct. 17, 2007, provisional application No. 61/032,032, filed on Feb. 27, 2008, provisional application No. 61/020,378, filed on Jan. 10, 2008.

(51) Int. Cl.
*H04B 7/208* (2006.01)

(52) U.S. Cl. ......................................................... 370/344

(58) Field of Classification Search ................... 375/260; 370/310, 328, 338, 343–344, 464, 480, 485
See application file for complete search history.

(56) References Cited

U.S. PATENT DOCUMENTS

| | | | |
|---|---|---|---|
| 6,545,997 B1 | 4/2003 | Bohnke et al. | |
| 2006/0002421 A1* | 1/2006 | Kuwahara et al. | 370/464 |
| 2006/0018250 A1 | 1/2006 | Gu et al. | |
| 2006/0050626 A1* | 3/2006 | Yucek et al. | 370/208 |
| 2006/0087961 A1 | 4/2006 | Chang et al. | |
| 2007/0274252 A1* | 11/2007 | Zhang et al. | 370/328 |
| 2008/0107047 A1* | 5/2008 | Olfat | 370/280 |
| 2008/0165866 A1* | 7/2008 | Teo et al. | 375/260 |
| 2008/0212692 A1* | 9/2008 | Banerjea et al. | 375/260 |
| 2009/0059887 A1* | 3/2009 | Pekonen et al. | 370/345 |
| 2010/0149961 A1* | 6/2010 | Lee et al. | 370/204 |

FOREIGN PATENT DOCUMENTS

WO    WO-2006/086093    8/2006

OTHER PUBLICATIONS

International Search Report and Written Opinion for PCT/US2008/080361, mailed Apr. 29, 2009, 9 pages.

* cited by examiner

*Primary Examiner* — Hassan Kizou
*Assistant Examiner* — Ashil Farahmand
(74) *Attorney, Agent, or Firm* — Duane Morris LLP

(57) ABSTRACT

An OFDM/OFDMA frame structure technology for communication systems is disclosed. The OFDM/OFDMA frame structure technology comprises a variable length sub-frame structure with efficiently sized cyclic prefixes and efficient transition gap durations operable to effectively utilize OFDM/OFDMA bandwidth. Furthermore, the frame structure provides compatibility with multiple wireless communication systems. An uplink frame structure and a downlink frame structure are provided.

17 Claims, 20 Drawing Sheets

| Parameter | | Unit | Parameter Values | | | | | |
|---|---|---|---|---|---|---|---|---|
| Transmission BW | | MHz | 1.25 | 2.5 | 5 | 10 | 20 | 40 |
| Sub-frame duration (Short) | | ms | 0.5 | | | | | |
| Sub-frame duration (Reg) | | | 1 | | | | | |
| Sub-frame duration (Long) | | | 1.5 | | | | | |
| Sub-carrier spacing | | KHz | 12.5 | | | | | |
| Sampling frequency | | Mhz | 1.6 | 3.2 | 6.4 | 12.8 | 25.6 | 51.2 |
| FFT size | | | 128 | 256 | 512 | 1024 | 2048 | 4096 |
| Number of occupied subcarriers | | | 100 | 200 | 400 | 800 | 1600 | 3200 |
| Number of OFDM symbols per sub frame (Short) | Short CP | | 6 | | | | | |
| | Long CP | | 5 | | | | | |
| Number of OFDM symbols per sub frame (Reg) | Short CP | | 12 | | | | | |
| | Normal CP | | 11 | | | | | |
| | Long CP | | 10 | | | | | |
| Number of OFDM symbols per sub frame (Long) | Short CP | | 18 | | | | | |
| | Normal CP | | 16 | | | | | |
| | Long CP | | 15 | | | | | |
| TG + Twin | Short | µs | 3.125 | 3.125 | 3.125 | 3.125 | 3.125 | 3.125 |
| | | samples | 5 | 10 | 20 | 40 | 80 | 160 |
| | Normal | µs | 10 | 10 | 10 | 10 | 10 | 10 |
| | | samples | 16 | 32 | 64 | 128 | 256 | 512 |
| | Long | µs | 16.875 | 16.875 | 16.875 | 16.875 | 16.875 | 16.875 |
| | | samples | 27 | 54 | 108 | 216 | 432 | 864 |
| DL-TTG, UL-TTG, UL-RTG of sub frame (Short) | Short CP | µs | 1.25 | | 1.25 | | 0 | |
| | Long CP | | 15.625 | | 14.375 | | 1.25 | |
| DL-TTG, UL-TTG, UL-RTG of sub frame (Reg) | Short CP | µs | 2.5 | | 2.5 | | 0 | |
| | Normal CP | | 10 | | 8.75 | | 1.25 | |
| | Long CP | | 31.25 | | 30 | | 1.25 | |
| DL-TTG, UL-TTG, UL-RTG of sub frame (Long) | Short CP | µs | 3.75 | | 2.5 | | 1.25 | |
| | Normal CP | | 60 | | 58.75 | | 1.25 | |
| | Long CP | | 46.875 | | 45.625 | | 1.25 | |

FIG. 14

| Parameter | | Unit | Parameter Values | | | | | |
|---|---|---|---|---|---|---|---|---|
| Transmission BW | | MHz | 3.5 | 7 | 14 | 28 | 56 | 112 |
| Sub-carrier Spacing (Δf) | | ms | 0.5 | | | | | |
| Sub-frame duration (Reg) | | | 1 | | | | | |
| Sub-frame duration (Long) | | | 1.5 | | | | | |
| Sub-carrier spacing | | KHz | 12.5 | | | | | |
| Sampling frequency | | Mhz | 6.4 | 12.8 | 25.6 | 51.2 | 102.4 | 204.8 |
| FFT size | | | 512 | 1024 | 2048 | 4096 | 8192 | 16384 |
| Number of occupied subcarriers | | | 280 | 560 | 1120 | 2240 | 4480 | 8960 |
| Number of OFDM symbols per sub frame (Short) | Short CP | | 6 | | | | | |
| | Long CP | | 5 | | | | | |
| Number of OFDM symbols per sub frame (Reg) | Short CP | | 12 | | | | | |
| | Normal CP | | 11 | | | | | |
| | Long CP | | 10 | | | | | |
| Number of OFDM symbols per sub frame (Long) | Short CP | | 18 | | | | | |
| | Normal CP | | 16 | | | | | |
| | Long CP | | 15 | | | | | |
| TG + Twin | Short | μs | 2.96875 | 3.28125 | 3.28125 | 3.28125 | 3.28125 | 3.28125 |
| | | samples | 19 | 42 | 84 | 168 | 336 | 672 |
| | Normal | μs | 10 | 10 | 10 | 10 | 10 | 10 |
| | | samples | 64 | 128 | 256 | 512 | 1024 | 2048 |
| | Long | μs | 16.71875 | 16.71875 | 16.71875 | 16.71875 | 16.71875 | 16.71875 |
| | | samples | 107 | 214 | 428 | 856 | 1712 | 3424 |
| DL-TTG, UL-TTG, UL-RTG of sub frame (Short) | Short CP | μs | 2.1875 | | 2.1875 | | 0 | |
| | Long CP | | 16.40625 | | 16.09375 | | 0.3125 | |
| DL-TTG, UL-TTG, UL-RTG of sub frame (Reg) | Short CP | μs | 4.375 | | 4.375 | | 0 | |
| | Normal CP | | 10 | | 9.6875 | | 0.3125 | |
| | Long CP | | 32.8125 | | 32.5 | | 0.3125 | |
| DL-TTG, UL-TTG, UL-RTG of sub frame (Long) | Short CP | μs | 6.5625 | | 6.25 | | 0.3125 | |
| | Normal CP | | 60 | | 59.6875 | | 0.3125 | |
| | Long CP | | 49.21875 | | 48.90625 | | 0.3125 | |

*FIG. 15*

| Parameter | Unit | Parameter Values | | | | | |
|---|---|---|---|---|---|---|---|
| Transmission BW | MHz | 1.25 | 2.5 | 5 | 10 | 20 | 40 |
| Sub-carrier Spacing ($\Delta f$) | KHz | 12.5 | | | | | |
| Sampling frequency | Mhz | 1.6 | 3.2 | 6.4 | 12.8 | 25.6 | 51.2 |
| FFT size | | 128 | 256 | 512 | 1024 | 2048 | 4096 |
| Number of occupied subcarriers | | 101 | 201 | 401 | 801 | 1601 | 3201 |
| TG + Twin — Short CP | µs | 2.5 | 2.5 | 2.5 | 2.5 | 2.5 | 2.5 |
| | samples | 4 | 8 | 16 | 32 | 64 | 128 |
| TG + Twin — Normal CP | µs | 9.375 | 9.375 | 9.375 | 9.375 | 9.375 | 9.375 |
| | samples | 15 | 30 | 60 | 120 | 240 | 480 |
| TG + Twin — Long CP | µs | 16.875 | 16.875 | 16.875 | 16.875 | 16.875 | 16.875 |
| | samples | 27 | 54 | 108 | 216 | 432 | 864 |

*FIG. 16*

| Parameter | Unit | Parameter Values | | | | | |
|---|---|---|---|---|---|---|---|
| Transmission BW | MHz | 3.5 | 7 | 14 | 28 | 56 | 112 |
| Sub-carrier Spacing ($\Delta f$) | KHz | 12.5 | | | | | |
| Sampling Frequency (Fs) | Mhz | 6.4 | 12.8 | 25.6 | 51.2 | 102.4 | 204.8 |
| FFT size | | 512 | 1024 | 2048 | 4096 | 8192 | 16384 |
| Number of occupied subcarriers | | 281 | 561 | 1121 | 2241 | 4481 | 8961 |
| TG + Twin — Short CP | µs | 2.5 | 2.5 | 2.5 | 2.5 | 2.5 | 2.5 |
| | samples | 16 | 32 | 64 | 128 | 256 | 512 |
| TG + Twin — Normal CP | µs | 9.375 | 9.375 | 9.375 | 9.375 | 9.375 | 9.375 |
| | samples | 60 | 120 | 240 | 480 | 960 | 1920 |
| TG + Twin — Long CP | µs | 16.875 | 16.875 | 16.875 | 16.875 | 16.875 | 16.875 |
| | samples | 108 | 216 | 432 | 864 | 1728 | 3456 |

*FIG. 17*

| 0.5 (ms) Sub-frame duration | | ms | 0.5 | | |
|---|---|---|---|---|---|
| Number of OFDM symbols per sub frame | Short CP ($N_S$) | | 6 | | |
| | Normal CP ($N_R$) | | 5 | | |
| | Long CP ($N_L$) | | 4 | | |
| Total Idle Time | Short CP | μs | 5 | | |
| | Normal CP | | 53.125 | | |
| | Long CP | | 112.5 | | |
| TTG-DL, TTG-UL, RTG-UL of sub frame (TTG = TTG-DL+TTG-UL, RTG = RTG-UL) | Short CP | μs | 5 | 2.5 | 2.5 |
| | Normal CP | | 53.125 | 50.625 | 2.5 |
| | Long CP | | 112.5 | 110 | 2.5 |

*FIG. 18*

| 0.675 (ms) Sub-frame duration | | ms | 0.675 | | |
|---|---|---|---|---|---|
| Number of OFDM symbols per sub frame | Short CP ($N_S$) | | 8 | | |
| | Normal CP ($N_R$) | | 7 | | |
| | Long CP ($N_L$) | | 6 | | |
| Total Idle Time | Short CP | μs | 15 | | |
| | Normal CP | | 49.375 | | |
| | Long CP | | 93.75 | | |
| TTG-DL, TTG-UL, RTG-UL of sub frame (TTG = TTG-DL+TTG-UL, RTG = RTG-UL) | Short CP | μs | 15 | 12.5 | 2.5 |
| | Normal CP | | 49.375 | 46.875 | 2.5 |
| | Long CP | | 93.75 | 91.25 | 2.5 |

*FIG. 19*

| 1.0 (ms) Sub-frame duration | | ms | 1 | | |
|---|---|---|---|---|---|
| Number of OFDM symbols per sub frame | Short CP ($N_S$) | | 12 | | |
| | Normal CP ($N_R$) | | 11 | | |
| | Long CP ($N_L$) | | 10 | | |
| Total Idle Time | Short CP | μs | 10 | | |
| | Normal CP | | 16.875 | | |
| | Long CP | | 31.25 | | |
| TTG-DL, TTG-UL, RTG UL of sub frame (TTG = TTG-DL+TTG-UL, RTG = RTG-UL) | Short CP | μs | 10 | 7.5 | 2.5 |
| | Normal CP | | 16.875 | 14.375 | 2.5 |
| | Long CP | | 31.25 | 28.75 | 2.5 |

FIG. 20

| 1.5 (ms) Sub-frame duration | | ms | 1.5 | | |
|---|---|---|---|---|---|
| Number of OFDM symbols per sub frame | Short CP ($N_S$) | | 18 | | |
| | Normal CP ($N_R$) | | 16 | | |
| | Long CP ($N_L$) | | 15 | | |
| Total Idle Time | Short CP | μs | 15 | | |
| | Normal CP | | 70 | | |
| | Long CP | | 46.875 | | |
| TTG-DL, TTG-UL, RTG UL of sub frame (TTG = TTG-DL+TTG-UL, RTG = RTG-UL) | Short CP | μs | 15 | 12.5 | 2.5 |
| | Normal CP | | 70 | 67.5 | 2.5 |
| | Long CP | | 46.875 | 44.375 | 2.5 |

| 2.0 (ms) Sub-frame duration | | ms | 2 | | |
|---|---|---|---|---|---|
| Number of OFDM symbols per sub frame | Short CP (N$_S$) | | 24 | | |
| | Normal CP (N$_R$) | | 22 | | |
| | Long CP (N$_L$) | | 20 | | |
| Total Idle Time | Short CP | μs | 20 | | |
| | Normal CP | | 33.75 | | |
| | Long CP | | 62.5 | | |
| TTG-DL, TTG-UL, RTG UL of sub frame (TTG = TTG-DL+TTG-UL, RTG = RTG-UL) | Short CP | μs | 20 | 17.5 | 2.5 |
| | Normal CP | | 33.75 | 31.25 | 2.5 |
| | Long CP | | 62.5 | 60 | 2.5 |

| 2.5 (ms) Sub-frame duration | | ms | 2.5 | | |
|---|---|---|---|---|---|
| Number of OFDM symbols per sub frame | Short CP (N$_S$) | | 30 | | |
| | Normal CP (N$_R$) | | 27 | | |
| | Long CP (N$_L$) | | 25 | | |
| Total Idle Time | Short CP | μs | 25 | | |
| | Normal CP | | 86.875 | | |
| | Long CP | | 78.125 | | |
| TTG-DL, TTG-UL, RTG UL of sub frame (TTG = TTG-DL+TTG-UL, RTG = RTG-UL) | Short CP | μs | 25 | 22.5 | 2.5 |
| | Normal CP | | 86.875 | 84.375 | 2.5 |
| | Long CP | | 78.125 | 75.625 | 2.5 |

| Parameter | | Unit | Parameter Values | | | | | |
|---|---|---|---|---|---|---|---|---|
| Transmissin Bandwidth (BW) | | MHz | 5 | 7 | 8.75 | 10 | 14 | 20 |
| Sub-carrier Spacing ($\Delta f$) | | KHz | 10.9375 | | | | | |
| Sampling Frequency (Fs) | | Mhz | 5.6 | 11.2 | 11.2 | 11.2 | 22.4 | 22.4 |
| FFT size | | | 512 | 1024 | 1024 | 1024 | 2048 | 2048 |
| Number of Used sub-carriers | | | TBD | TBD | TBD | TBD | TBD | TBD |
| CP Length ($T_G$) | Short CP | µs | 2.85714286 | 2.857143 | 2.857143 | 2.857143 | 2.857143 | 2.857143 |
| | Normal CP | µs | 11.4285714 | 11.42857 | 11.42857 | 11.42857 | 11.42857 | 11.42857 |
| | Long CP | µs | 17.1428571 | 17.14286 | 17.14286 | 17.14286 | 17.14286 | 17.14286 |
| | Long CP 2 | µs | 22.8571429 | 22.85714 | 22.85714 | 22.85714 | 22.85714 | 22.85714 |
| Sub-frame duration | | ms | 0.5 | 0.675 | 1 | 1.5 | 2 | 2.5 |
| Number of OFDM Symbols Per Sub-frame | Short CP ($N_S$) | | 5 | 7 | 10 | 15 | 21 | 26 |
| | Normal CP ($N_R$) | | 4 | 6 | 9 | 14 | 19 | 24 |
| | Long CP ($N_L$) | | 4 | 5 | 8 | 13 | 18 | 22 |
| | Long CP 2 ($N_L$) | | 3 | 5 | 8 | 12 | 17 | 21 |
| Sub-Frame Idle Time (TTG-DL or TTG-UL) | Short CP | µs | 28.5714286 | 15 | 57.14286 | 85.71429 | 20 | 48.57143 |
| | Normal CP | | 88.5714286 | 57.85714 | 74.28571 | 60 | 45.71429 | 31.42857 |
| | Long CP | | 65.7142857 | 132.1429 | 131.4286 | 88.57143 | 45.71429 | 111.4286 |
| | Long CP 2 | | 157.142857 | 103.5714 | 85.71429 | 128.5714 | 57.14286 | 100 |

*FIG. 24*

| Parameter | | Unit | Parameter Values | | | | | |
|---|---|---|---|---|---|---|---|---|
| TRansmission Bandwidth (BW) | | MHz | 5 | 7 | 8.75 | 10 | 14 | 20 |
| Sub-carrier Spacing ($\Delta f$) | | KHz | 12.5 | | | | | |
| Sampling Frequency (Fs) | | Mhz | 6.4 | 12.8 | 12.8 | 12.8 | 25.6 | 25.6 |
| FFT size | | | 512 | 1024 | 1024 | 1024 | 2048 | 2048 |
| Number of Used sub-carriers | | | 401 | 561 | 701 | 801 | 1121 | 1601 |
| CP Length ($T_G$) | Short CP | µs | 2.5 | 2.5 | 2.5 | 2.5 | 2.5 | 2.5 |
| | Normal CP | µs | 10 | 10 | 10 | 10 | 10 | 10 |
| | Long CP | µs | 15 | 15 | 15 | 15 | 15 | 15 |
| | Long CP 2 | µs | 20 | 20 | 20 | 20 | 20 | 20 |
| Sub-frame duration | | ms | 0.5 | 0.675 | 1 | 1.5 | 2 | 2.5 |
| Number of OFDM Symbols Per Sub-frame | Short CP ($N_S$) | | 6 | 8 | 12 | 18 | 24 | 30 |
| | Normal CP ($N_R$) | | 5 | 7 | 10 | 16 | 22 | 27 |
| | Long CP ($N_L$) | | 4 | 6 | 10 | 15 | 20 | 26 |
| | Long CP 2 ($N_L$) | | 4 | 6 | 9 | 14 | 19 | 24 |
| Sub-Frame Idle Time (TTG-DL or TTG-UL) | Short CP | µs | 5 | 15 | 10 | 15 | 20 | 25 |
| | Normal CP | | 50 | 45 | 100 | 60 | 20 | 70 |
| | Long CP | | 120 | 105 | 50 | 75 | 100 | 30 |
| | Long CP 2 | | 100 | 75 | 100 | 100 | 100 | 100 |

OFDM/OFDMA FRAME STRUCTURE FOR COMMUNICATION SYSTEMS

CROSS-REFERENCE TO RELATED APPLICATIONS

This application claims priority to U.S. Provisional Patent Application No. 60/980,760 filed on Oct. 17, 2007, U.S. Provisional Patent Application No. 61/032,032 filed on Feb. 27, 2008, and U.S. Provisional Patent Application No. 61/020,378 filed Jan. 10, 2008, the contents of which are incorporated by reference herein in their entirety.

FIELD OF THE INVENTION

The present invention relates generally to digital communications and more particularly to Orthogonal Frequency Division Multiplexing (OFDM) and Orthogonal Frequency Division Multiple Access (OFDMA) systems.

BACKGROUND OF THE INVENTION

There is an increasing need for mobile high speed communication systems to provide a variety of services such as the Internet, television, photo sharing, and downloading music files. In order to provide such services, a mobile high speed communication system must be able to overcome a variety of difficult operating conditions caused by the environment. Among these operating conditions are multipath signals, inter-symbol interference (ISI), and inter-channel interference (ICI). In mobile high speed communication systems, multipath is interference resulting from radio signals reaching the receiving antenna by two or more paths. Causes of multipath include atmospheric ducting, ionospheric reflection and refraction, and reflection from terrestrial objects, such as mountains and buildings. In telecommunications, ISI is a form of distortion of a signal in which one symbol interferes with subsequent symbols. ICI is a form of distortion of a signal caused by transmission of signals on adjacent channels that may interfere with one another.

FIG. 1 illustrates a mobile radio channel operating environment 100. The mobile radio channel operating environment 100 may include a base station (BS) 102, a mobile station (MS) 104, various obstacles 106/108/110, and a cluster of notional hexagonal cells 126/130/132/134/136/138/140 overlaying a geographical area 101. Each cell 126/130/132/134/136/138/140 may include a base station operating at its allocated bandwidth to provide adequate radio coverage to its intended users. For example, the base station 102 may operate at an allocated channel transmission bandwidth to provide adequate coverage to the mobile station 104. The base station 102 and the mobile station 104 may communicate via a downlink radio frame 118, and an uplink radio frame 124 respectively. Each radio frame 118/124 may be further divided into sub-frames 120/126 which may include data symbols 122/128. In this mobile radio channel operating environment 100, a signal transmitted from a base station 102 may suffer from the operating conditions mentioned above. For example, multipath signal components 112 may occur as a consequence of reflections, scattering, and diffraction of the transmitted signal by natural and/or man-made objects 106/108/110. At the receiver antenna 114, a multitude of signals may arrive from many different directions with different delays, attenuations, and phases. Generally, the time difference between the arrival moment of the first received multipath component 116 (typically the line of sight component), and the last received multipath component (possibly any of the multipath signal components 112) is called delay spread. The combination of signals with various delays, attenuations, and phases may create distortions such as ISI and ICI in the received signal. The distortion may complicate reception and conversion of the received signal into useful information. For example, delay spread may cause ISI in the useful information (data symbols) contained in the radio frame 124.

Orthogonal Frequency Division Multiplexing (OFDM) is one technique that is being developed for high speed communications that can mitigate delay spread and many other difficult operating conditions. OFDM divides an allocated radio communication channel into a number of orthogonal subchannels of equal bandwidth. Each subchannel is modulated by a unique group of subcarrier signals, whose frequencies are equally and minimally spaced for optimal bandwidth efficiency. The group of subcarrier signals are chosen to be orthogonal, meaning the inner product of any two of the subcarriers equals zero. In this manner, the entire bandwidth allocated to the system is divided into orthogonal subcarriers.

Orthogonal Frequency Division Multiple Access (OFDMA) is a multi-user version of OFDM. For a communication device such as the base station 102, multiple access is accomplished by assigning subsets of orthogonal sub-carriers to individual subscriber devices. A subscriber device may be a mobile station 104 with which the base station 102 is communicating.

An inverse fast Fourier transform (IFFT) is often used to form the subcarriers, and the number of orthogonal subcarriers determines the fast Fourier transform (FFT) size ($N_{FFT}$) to be used. An information symbol (e.g., data symbol) in the frequency domain of the IFFT is transformed into a time domain modulation of the orthogonal subcarriers. The modulation of the orthogonal subcarriers forms an information symbol in the time domain with a duration $T_u$. Duration $T_u$ is generally referred to as the OFDM useful symbol duration. For the subcarriers to remain orthogonal, the spacing between the orthogonal subcarriers $\Delta f$ is chosen to be $$\frac{1}{T_u},$$

and vice versa the OFDM symbol duration $T_u$ is $$\frac{1}{\Delta f}.$$

The number of available orthogonal subcarriers $N_C$ (an integer less than or equal to $N_{FFT}$) is the channel transmission bandwidth (BW) divided by the subcarrier spacing $$\frac{BW}{\Delta f},$$

or $BW*T_u$.

FIG. 2 illustrates principles of an OFDM/OFDMA multi-carrier transmission with four subcarriers. The principle of multi-carrier transmission is to convert a serial high-rate data stream 202 into multiple parallel low-rate sub-streams 204 by a serial-to-parallel converter. Each parallel sub-stream is modulated on to one of $N_C$ orthogonal sub-carriers 206, where $N_C$ is an integer that, for example, can be greater than or equal to 128. The $N_C$ sub-streams are modulated onto the $N_C$ sub-carriers 206 with a spacing of Δf in order to achieve orthogonality between the signals on the $N_C$ sub-carriers 206. The resulting $N_C$ parallel modulated data symbols 210 are referred to as an OFDM symbol. Since the symbol rate on each sub-carrier 206 is much less than the symbol rate of the initial serial data 202, the OFDM symbols are less sensitive to timing. Thus, the effects of symbol overlap (i.e., ISI) caused by delay spread decrease for the channel.

FIG. 3 illustrates ISI between OFDM/OFDMA symbols. As shown in FIG. 3, OFDM/OFDMA symbols S1-S3 may be transmitted on the sub-frame 120 of the downlink radio sub-frame 118 from the base station (BS) 102 to the mobile station (MS) 104 (FIG. 1). Multipath components 112 (FIG. 1) may cause a delay spread 302 of the symbols S1-S3. The delay spread may cause the OFDM/OFDMA symbols S1-S3 to overlap each other, such that ISI 304 occurs between OFDM/OFDMA symbols S1-S2 and S2-S3. If the ISI is large enough, the signal reception may be disrupted.

In order to make an OFDM/OFDMA system more robust to multipath signals, an extension is made to the information symbol called a cyclic prefix. The cyclic prefix 402 is generally inserted between adjacent OFDM/OFDMA symbols as shown in FIG. 4. The cyclic prefix 402 is typically pre-pended to each OFDM/OFDMA symbol and is used to compensate for the delay spread introduced by the radio channel as explained below. The cyclic prefix 402 can also compensate for other sources of delay spread such as that from pulse shaping filters often used in transmitters. By significantly reducing or avoiding the effects of ISI and ICI, the cyclic prefix 402 also helps to maintain orthogonally between the OFDM/OFDMA signals on the sub-carriers 206 (FIG. 2). The cyclic prefix 402 has a duration $T_G$, which may be added to the useful symbol duration $T_u$. Thus, a total OFDM/OFDMA symbol duration $T_{SYM}$ may be $T_u+T_G$. Although, in this example, a total OFDM/OFDMA symbol duration of $T_{SYM}=T_u+T_G$ may be employed for transmitting an OFDM/OFDMA symbol, only the useful symbol duration $T_u$ (FIG. 2) may be available for user's data symbol transmission.

As mentioned above, the cyclic prefix 402 is a cyclic extension of each OFDM/OFDMA symbol, which is obtained by extending the duration of an OFDM/OFDMA symbol. FIG. 5 shows an exemplary cyclic prefix. In FIG. 5, a sinusoidal curve 504 corresponds to an original sinusoid where one cycle of the sinusoid is of duration 3.2 μs (i.e., 64 samples with 20 MHz sampling rate). For this example, the subcarrier frequency is 312.5 KHz. A cyclic prefix 502 of 16 samples (0.8 μs) is pre-appended to the original subcarrier 504 which still has the original sinusoid of frequency 312.5 KHz. The sinusoid is now of duration 4.0 μs, which allows the receiver to choose one period (3.2 μs) of the subcarrier 504 from the bigger window (4.0 μs). In this manner, the cyclic prefix 502 acts as a buffer region. The receiver at the mobile station 104 (FIG. 1) may exclude samples from the cyclic prefix 502/402 that are corrupted by the previous symbol when choosing samples for OFDM/OFDMA symbols (e.g., S1-S3 (FIG. 3)). The cyclic prefix 502/402 duration should be optimized to increase bandwidth efficiency (i.e., bit/Hz).

In telecommunications, a frame is a fixed or variable length packet of data, which has been encoded by a communications protocol for digital transmission. A frame structure is the way a communication channel is divided into frames (e.g., 118/124 in FIG. 1) or sub-frames (e.g., 120/126 in FIG. 1) for transmission. The frame structure of an OFDM or OFDMA system contributes to determining the performance of a communication system. In a communications system, the size and timing of a cyclic prefix in a frame is specified by a frame structure.

In existing OFDM/OFDMA systems, such as Wireless Interoperability for Microwave Access (WiMAX), the cyclic prefix is configurable, but it is fixed when a system is deployed. This limits configuration of the system for efficient bandwidth utilization since the cyclic prefix cannot be reconfigured. Additionally, in existing frame structures, there are no mechanisms to allow a base station to change or reconfigure the cyclic prefix duration for different communication usage scenarios. For example, when communication in a channel suffers from severe multipath effects (i.e., large delay spread), a longer cyclic prefix can be used to eliminate the ISI and ICI. In less severe channel conditions, with fewer multipath issues, a short cyclic prefix can be used in order to reduce overhead and transmission power. Therefore, there is a need for systems and methods that provide a frame structure for high performance OFDM and OFDMA systems that more efficiently use the cyclic prefix.

SUMMARY OF THE INVENTION

An OFDM/OFDMA frame structure technology for communication systems is disclosed. The OFDM/OFDMA frame structure technology comprises a variable length sub-frame structure with efficiently sized cyclic prefixes, and efficient transition gap durations operable to effectively utilize OFDM/OFDMA bandwidth. Furthermore, the frame structure provides compatibility with multiple wireless communication systems. An uplink frame structure and a downlink frame structure are provided.

A first embodiment comprises an OFDM/OFDMA communication system. The OFDM/OFDMA communication system comprises a plurality of radio frequency (RF) channels, wherein the RF channels comprise dissimilar bandwidths. The system also comprises a transmitter for providing a plurality of OFDM subcarriers. The OFDM subcarriers comprise a fixed subcarrier spacing chosen such that the OFDM subcarriers are scalable in number to utilize any of the RF channels. In one embodiment, all RF channel bandwidths in the communication system can be divided evenly by the subcarrier spacing.

In addition, the system can further comprises a processor coupled to the transmitter and operable to provide a flexible radio frame structure comprising a plurality of variable length cyclic prefixes operable for the RF channels.

A second embodiment comprises a communication system. The communication system comprises at least one base station supporting variable cyclic prefix durations. The variable cyclic prefix durations are chosen based on a cell coverage area of the at least one base station. The system also comprises a processor for providing a flexible radio frame structure utilizing the variable size cyclic prefix durations. The flexible radio frame structure is used by the at least one base station for transmitting data to a mobile station. The processor may also be operable to calculate a plurality of timing gaps associated with at least one of the sub-frames, wherein the timing gaps are calculated based in part on the variable cyclic prefix durations.

A third embodiment comprises an OFDM/OFDMA radio frame structure for communication in an RF channel in a wireless network. The radio frame structure comprises a plurality of OFDM symbols each comprising a variable cyclic prefix duration and at least one OFDM data symbol. The frame structure also comprises a plurality of variable size sub-frames formed from a subset of the OFDM symbols, and a plurality of radio frames for transmitting a subset of the variable sub-frames through the RF channel. The frame structure further comprises a plurality of timing gaps associated with the radio frames for providing a protection for timing variations at signal reception. The timing gaps are calculated based, at least in part, on the variable cyclic prefix duration.

A fourth embodiment comprises a communication system. The communication system comprises a plurality of RF channels, wherein a subset of the RF channels have dissimilar channel bandwidths. The system also comprises an inverse fast Fourier transform (IFFT) module operable for transforming a plurality of frequency domain data symbols into a plurality of time domain data symbols respectively. The system further comprises a cyclic prefix selector operable for selecting a cyclic prefix from a plurality of variable length cyclic prefixes to obtain a selected cyclic prefix. The system also comprises an add cyclic prefix module operable for adding the selected cyclic prefix to each of the time domain data symbols to obtain a plurality of OFDM frames.

The system may also comprise a processor operable for providing a plurality of variable size sub-frames formed from a subset of the OFDM frames. The processor is also operable for providing a plurality of radio frames for transmitting a subset of the variable size sub-frames through at least one of the RF channels. The processor is further operable for calculating a plurality of timing gaps associated with at least one of the variable size sub-frames for providing a protection for timing variations at signal reception. The timing gap is calculated based, at least in part, on a cyclic prefix duration of the selected cyclic prefix.

A fifth embodiment comprises a method for communication in a communication system. The method comprises receiving a time domain data symbol for transmission on a radio channel, and selecting a cyclic prefix from a plurality of variable length cyclic prefixes to obtain a selected cyclic prefix. The method also comprises adding the selected cyclic prefix into each of the time domain data symbols to obtain a plurality of OFDM frames.

A sixth embodiment comprises a computer-readable medium for a communication system. The computer-readable medium comprises program code for receiving a time domain data symbol for transmission on a radio channel. The program code also selects a cyclic prefix from a plurality of variable length cyclic prefixes for the radio channel to obtain a selected cyclic prefix. The program code also adds the selected cyclic prefix into each of the time domain data symbols to obtain a plurality of OFDM frames.

The computer-readable medium may further comprise program code for adding the OFDM frames to a flexible sub-frame prior to transmitting the OFDM frames on the radio channel. The program code may also provide a plurality of variable size sub-frames formed from a subset of the OFDM frames, and provide a plurality of radio frames for transmitting a subset of the variable size sub-frames through the radio channel. The program code may also calculate a plurality of timing gaps associated with at least one of the variable size sub-frames for providing a protection for timing variations at signal reception. The timing gap is calculated based, at least in part, on a cyclic prefix duration of the selected cyclic prefix.

Further features and advantages of the present disclosure, as well as the structure and operation of various embodiments of the present disclosure, are described in detail below with reference to the accompanying drawings.

BRIEF DESCRIPTION OF THE DRAWINGS

The present disclosure, in accordance with one or more various embodiments, is described in detail with reference to the following Figures. The drawings are provided for purposes of illustration only and merely depict exemplary embodiments of the disclosure. These drawings are provided to facilitate the reader's understanding of the disclosure and should not be considered limiting of the breadth, scope, or applicability of the disclosure. It should be noted that for clarity and ease of illustration these drawings are not necessarily made to scale.

FIG. 14 is an illustration of an exemplary table of basic OFDM/OFDMA parameters for a n×1.25 MHz bandwidth series according to an embodiment of the invention.

FIG. 15 is an illustration of an exemplary table of basic OFDM/OFDMA parameters for a n×3.5 MHz bandwidth series according to an embodiment of the invention.

FIG. 16 is an illustration of an exemplary table of basic OFDM/OFDMA parameters for a n×1.25 MHz bandwidth series for 0.5, 0.675, 1, 1.5, 2, and 2.5 ms sub-frames according to an embodiment of the invention.

FIG. 17 is an illustration of an exemplary table of basic OFDM/OFDMA parameters for a n×3.5 MHz bandwidth series according to an embodiment of the invention.

FIG. 18 is an illustration of an exemplary table of basic OFDM/OFDMA parameters for a 0.5 ms sub-frame for a n×1.25 MHz bandwidth series, with a subcarrier frequency spacing $\Delta f=12.5$ KHz, according to an embodiment of the invention.

FIG. 19 is an illustration of an exemplary table of basic OFDM/OFDMA parameters for a 0.675 ms sub-frame for a n×1.25 MHz bandwidth series, with a subcarrier frequency spacing $\Delta f=12.5$ KHz, according to an embodiment of the invention.

FIG. 20 is an illustration of an exemplary table of basic OFDM/OFDMA parameters for a 1.0 ms sub-frame for a n×1.25 MHz bandwidth series, with a subcarrier frequency spacing $\Delta f=12.5$ KHz, according to an embodiment of the invention.

FIG. 21 is an illustration of an exemplary table of basic OFDM/OFDMA parameters for a 1.5 ms sub-frame for a n×1.25 MHz bandwidth series, with a subcarrier frequency spacing Δf=12.5 KHz, according to an embodiment of the invention.

FIG. 22 is an illustration of an exemplary table of basic OFDM/OFDMA parameters for a 2 ms sub-frame for a n×1.25 MHz bandwidth series, with a subcarrier frequency spacing Δf≈12.5 KHz, according to an embodiment of the invention.

FIG. 23 is an illustration of an exemplary table of basic OFDM/OFDMA parameters for a 2.5 ms sub-frame for a n×1.25 MHz bandwidth series, with a subcarrier frequency spacing Δf≈12.5 KHz, according to an embodiment of the invention.

FIG. 24 is an illustration of an exemplary table of basic OFDM/OFDMA parameters for a 5 MHz bandwidth series, with a subcarrier frequency spacing Δf≈10.94 KHz according to an embodiment of the invention.

FIG. 25 is an illustration of exemplary table of basic OFDM/OFDMA parameters for a 5 MHz bandwidth series, with a subcarrier frequency spacing Δf≈12.5 KHz, according to an embodiment of the invention.

DETAILED DESCRIPTION OF EXEMPLARY EMBODIMENTS

The following description is presented to enable a person of ordinary skill in the art to make and use the invention. Descriptions of specific devices, techniques, and applications are provided only as examples. Various modifications to the examples described herein will be readily apparent to those of ordinary skill in the art, and the general principles defined herein may be applied to other examples and applications without departing from the spirit and scope of the invention. Thus, the present invention is not intended to be limited to the examples described herein and shown, but is to be accorded the scope consistent with the claims.

The present disclosure is directed toward systems and methods for OFDM/OFDMA frame structure technology for communication systems. Embodiments of the invention are described herein in the context of one practical application, namely, communication between a base station and a plurality of mobile devices. In this context, the example system is applicable to provide data communications between a base station and a plurality of mobile devices. Embodiments of the disclosure, however, are not limited to such base station and mobile device communication applications, and the methods described herein may also be utilized in other applications such as mobile-to-mobile communications, or wireless local loop communications. As would be apparent to one of ordinary skill in the art after reading this description, these are merely examples and the invention is not limited to operating in accordance with these examples.

As explained in additional detail below, the OFDM/OFDMA frame structure comprises a variable length sub-frame structure with an efficiently sized cyclic prefix operable to effectively utilize OFDM/OFDMA bandwidth. The frame structure provides compatibility with multiple wireless communication systems.

Figure 1:
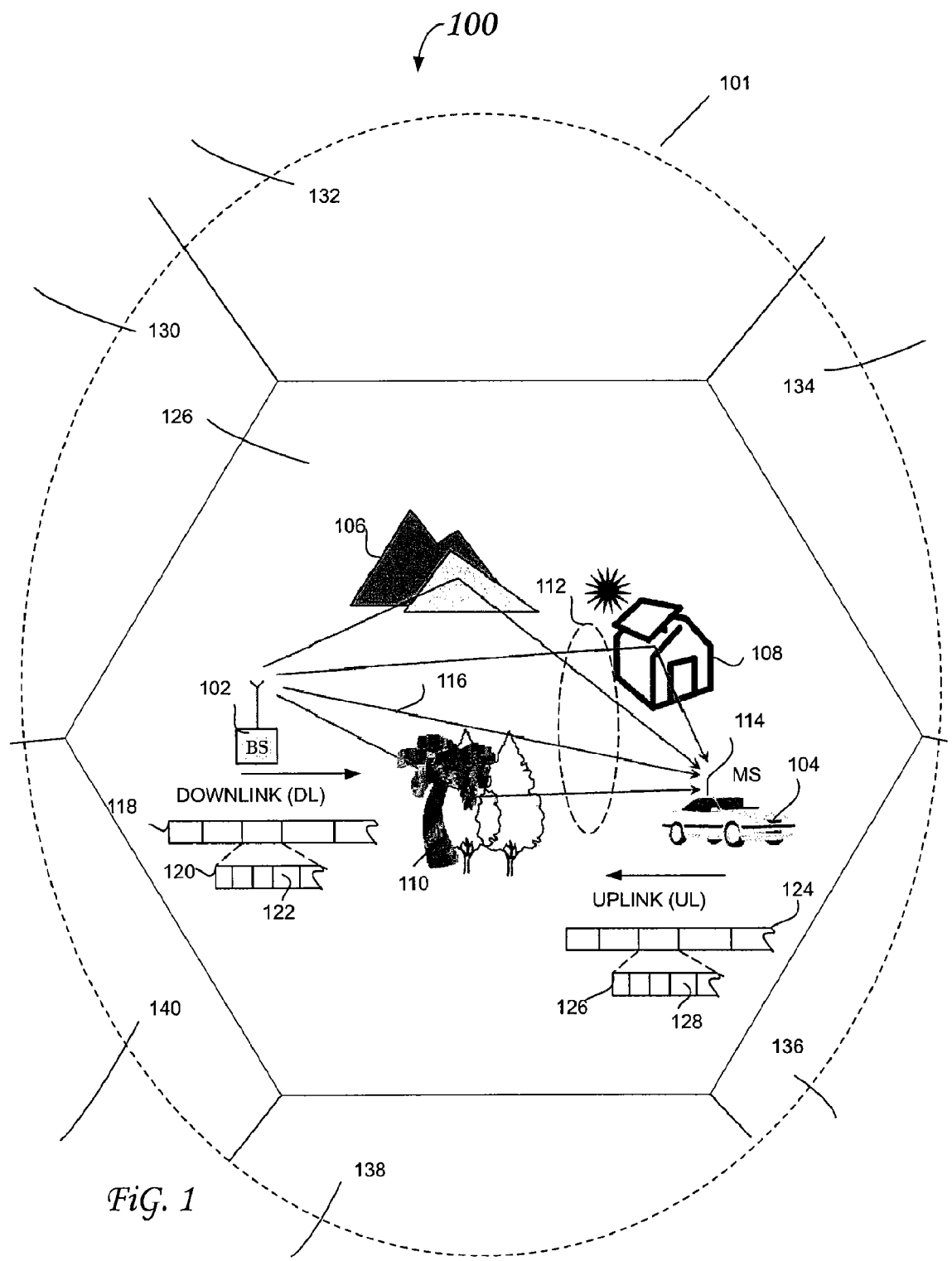
FIG. 1 is an illustration of an OFDM/OFDMA mobile radio channel operating environment.
Figure 6:
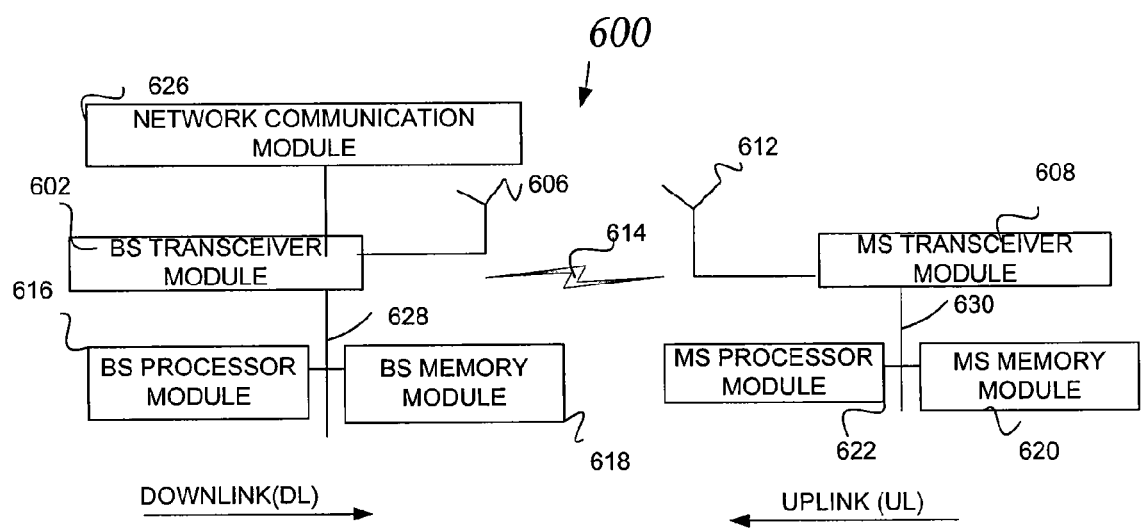
FIG. 6 is an illustration of an exemplary OFDM/OFDMA exemplary communication system according to an embodiment of the invention.

FIG. 6 shows an exemplary wireless communication system 600 for transmitting and receiving OFDM/OFDMA transmissions in accordance with the present invention. The system 600 may include components and elements configured to support known or conventional operating features that need not be described in detail herein. In the exemplary embodiment, system 600 can be used to transmit and receive OFDM/OFDMA data symbols in a wireless communication environment such as the wireless communication environment 100 (FIG. 1). System 600 generally comprises a base station transceiver module 602, a base station antenna 606, a mobile station transceiver module 608, a mobile station antenna 612, a base station processor module 616, a base station memory module 618, a mobile station memory module 620, a mobile station processor module 622, and a network communication module 626.

System 600 may comprise any number of modules other the modules shown in FIG. 6. Furthermore, these and other elements of system 600 may be interconnected together using a data communication bus (e.g., 628, 630), or any suitable interconnection arrangement. Such interconnection facilitates communication between the various elements of wireless system 600. Those skilled in the art will understand that the various illustrative blocks, modules, circuits, and processing logic described in connection with the embodiments disclosed herein may be implemented in hardware, computer-readable software, firmware, or any practical combination thereof. To clearly illustrate this interchangeability and compatibility of hardware, firmware, and software, various illustrative components, blocks, modules, circuits, and steps are described generally in terms of their functionality. Whether such functionality is implemented as hardware, firmware, or software depends upon the particular application and design constraints imposed on the overall system. Those familiar with the concepts described herein may implement such functionality in a suitable manner for each particular application, but such implementation decisions should not be interpreted as causing a departure from the scope of the present invention.

In the exemplary OFDM/OFDMA system 600, the base station transceiver 602 and the mobile station transceiver 608 each comprise a transmitter module and a receiver module (not shown in FIG. 6). Operation of the transmitter and receiver modules is explained in more detail in the context of the discussion of FIG. 7. For this example, the transmitter and receiver modules are coupled to a shared antenna to form a time division duplex (TDD) system. The base station transceiver 602 is coupled to the base station antenna 606 and the mobile station transceiver 608 is coupled to the base station antenna 612. Although in a simple time division duplex (TDD) system only one antenna is required, more sophisticated systems may be provided with multiple and/or more complex antenna configurations. Additionally, although not shown in this figure, those skilled in the art will recognize that a transmitter may transmit to more than one receiver, and that multiple transmitters may transmit to the same receiver. In a TDD system, transmit and receive timing gaps exist as guard bands to protect against transitions from transmit to receive and vice versa. For example, a transmission timing gap (TTG) is designed to separate the downlink transmission period TTG(DL) from uplink transmission period TTG(UL). The downlink TTG(DL) provides a protection for timing variations at signal reception in downlink transmission. The TTG(DL) portion of timing gap is also used to prevent the downlink radio signal colliding with uplink signals due to propagation delay. The TTG(UL) portion of timing gap is used to offset uplink radio signal propagation delay so that all uplink signals synchronized at the base station (BS) receiver (s). The TTG(DL) may allow sufficient time for a TDD system to transition from a downlink to an uplink. Similarly, a TTG for the uplink TTG(UL) may allow sufficient time for a TDD system to transition from an uplink to a downlink. According to an embodiment of the invention, the TTG(DL) and TTG(UL) can be calculated based on the cyclic prefix duration as explained in more detail in the context of discussing of FIG. 14.

In the particular example of the OFDM/OFDMA system depicted in FIG. 6, an "uplink" transceiver 608 includes an OFDM/OFDMA transmitter that shares an antenna with an uplink receiver. A duplex switch may alternatively couple the uplink transmitter or receiver to the uplink antenna in time duplex fashion. Similarly, a "downlink" transceiver includes an OFDM/OFDMA receiver which shares a downlink antenna with a downlink transmitter. A downlink duplex switch may alternatively couple the downlink transmitter or receiver to the downlink antenna in time duplex fashion. The operation of the two transceivers 602/608 is coordinated in time such that the uplink OFDM/OFDMA receiver is coupled to the uplink antenna 612 for reception of transmissions over the wireless transmission link 614 at the same time that the downlink OFDM/OFDMA transmitter is coupled to the downlink antenna 606. Preferably there is close time synchronization with only a minimal guard time between changes in duplex direction.

Although many OFDM/OFDMA systems will use OFDM/OFDMA technology in both directions, those skilled in the art will recognize that the present embodiments of the invention are applicable to systems using OFDM/OFDMA technology in only one direction, with an alternative transmission technology (or even radio silence) in the opposite direction. Furthermore, it should be understood by a person of ordinary skill in the art that the OFDM/OFDMA transceiver modules 602/608 may utilize other communication techniques such as, without limitation, a frequency division duplex (FDD) communication technique.

The mobile station transceiver 608 and the base station transceiver 602 are configured to communicate via a wireless data communication link 614. The mobile station transceiver 608 and the base station transceiver 602 cooperate with a suitably configured RF antenna arrangement 606/612 that can support a particular wireless communication protocol and modulation scheme. In the exemplary embodiment, the mobile station transceiver 608 and the base station transceiver 602 are configured to support industry standards such as the Third Generation Partnership Project Long Term Evolution (3GPP LTE), Third Generation Partnership Project 2 Ultra Mobile Broadband (3Gpp2 UMB), Time Division-Synchronous Code Division Multiple Access (TD-SCDMA), and Wireless Interoperability for Microwave Access (WiMAX), and the like. The mobile station transceiver 608 and the base station transceiver 602 may be configured to support alternate, or additional, wireless data communication protocols, including future variations of IEEE 802.16, such as 802.16e, 802.16m, and so on. In an exemplary embodiment, a mobile station transceiver 608 may be used in a user device such as a mobile phone. Alternately, the mobile station transceiver 608 may be used in a personal digital assistant (PDA) such as a Blackberry device, Palm Treo, MP3 player, or other similar portable device. In some embodiments the mobile station transceiver 608 may be a personal wireless computer such as a wireless notebook computer, a wireless palmtop computer, or other mobile computer devices. In further embodiments, the invention can be implemented in a mobile station as well as a base station. The transmitter at the mobile station can add the variable length cyclic prefixes and understand the changes of the timing gaps accordingly. However, in the current intended practices, the dynamic configuration of the variable length cyclic prefixes of mobile stations is set by the base station. The mobile stations can negotiate with the base station for the preferred cyclic prefix. The base station can assign it to a particular uplink sub-frame to transmit with the preferred cyclic prefix.

Processor modules 616/622 may be implemented, or realized, with a general purpose processor, a content addressable memory, a digital signal processor, an application specific integrated circuit, a field programmable gate array, any suitable programmable logic device, discrete gate or transistor logic, discrete hardware components, or any combination thereof, designed to perform the functions described herein. In this manner, a processor may be realized as a microprocessor, a controller, a microcontroller, a state machine, or the like. A processor may also be implemented as a combination of computing devices, e.g., a combination of a digital signal processor and a microprocessor, a plurality of microprocessors, one or more microprocessors in conjunction with a digital signal processor core, or any other such configuration. Processor modules 616/622 comprise processing logic that is configured to carry out the functions, techniques, and processing tasks associated with the operation of OFDM/OFDMA system 600. In particular, the processing logic is configured to support the OFDM/OFDMA frame structure parameters described herein. For, example the processor modules 616/612 may be suitably configured to compute cyclic prefix durations and timing transitions (TDD (UL) and TDD (DL)), as explained below, to provide a flexible size frame structure. For example, a frame may be constructed from one or multiple sub-frames, each sub-frame is consisted of one or multiple symbols and timing gaps. A timing gap is the period of idle transmission time, such as TTG(DL), TTG (UL), or RTG. Based on this new definition, the gap time periods, TTG and RTG, have been included in the sub-frames. This way to define a frame and sub-frame (also known as "slot" in LTE) has greatly simply the design of a frame, and make it much more flexible for different sub-frame designs. The newly defined sub-frame has been self-contained within its time period and boundary. Sub-frames with different cyclic prefixes can co-exist in the same system and the same deployment. As mentioned above, in some embodiments the processing logic may be resident in the base station and/or may be part of a network architecture that communicates with the base station transceiver 602.

Furthermore, the steps of a method or algorithm described in connection with the embodiments disclosed herein may be embodied directly in hardware, in firmware, in a software module executed by processor modules 616/622, or in any practical combination thereof. A software module may reside in memory modules 618/620, which may be realized as RAM memory, flash memory, ROM memory, EPROM memory, EEPROM memory, registers, a hard disk, a removable disk, a CD-ROM, or any other form of storage medium known in the art. In this regard, memory modules 618/620 may be coupled to the processor modules 616/622 respectively such that the processors modules 616/622 can read information from, and write information to, memory modules 618/620. As an example, processor module 616, and memory modules 618, processor module 622, and memory module 620 may reside in their respective ASICs. The memory modules 618/620 may also be integrated into the processor modules 616/622. In an embodiment, the memory module 618/620 may include a cache memory for storing temporary variables or other intermediate information during execution of instructions to be executed by processor modules 616/622. Memory modules 618/620 may also include non-volatile memory for storing instructions to be executed by the processor modules 616/622.

Memory modules 618/620 may include a frame structure database (not shown) in accordance with an exemplary embodiment of the invention. Frame structure parameter databases may be configured to store, maintain, and provide data as needed to support the functionality of system 600 in the manner described below. Moreover, a frame structure database may be a local database coupled to the processors 616/622, or may be a remote database, for example, a central network database, and the like. A frame structure database may be configured to maintain, without limitation, frame structure parameters as explained below. In this manner, a frame structure database may include a lookup table for purposes of storing frame structure parameters.

The network communication module 626 generally represents the hardware, software, firmware, processing logic, and/or other components of system 600 that enable bi-directional communication between base station transceiver 602, and network components to which the base station transceiver 602 is connected. For example, network communication module 626 may be configured to support internet or WiMAX traffic. In a typical deployment, without limitation, network communication module 626 provides an 802.3 Ethernet interface such that base station transceiver 602 can communicate with a conventional Ethernet based computer network. In this manner, the network communication module 626 may include a physical interface for connection to the computer network (e.g., Mobile Switching Center (MSC)).

Figure 7:
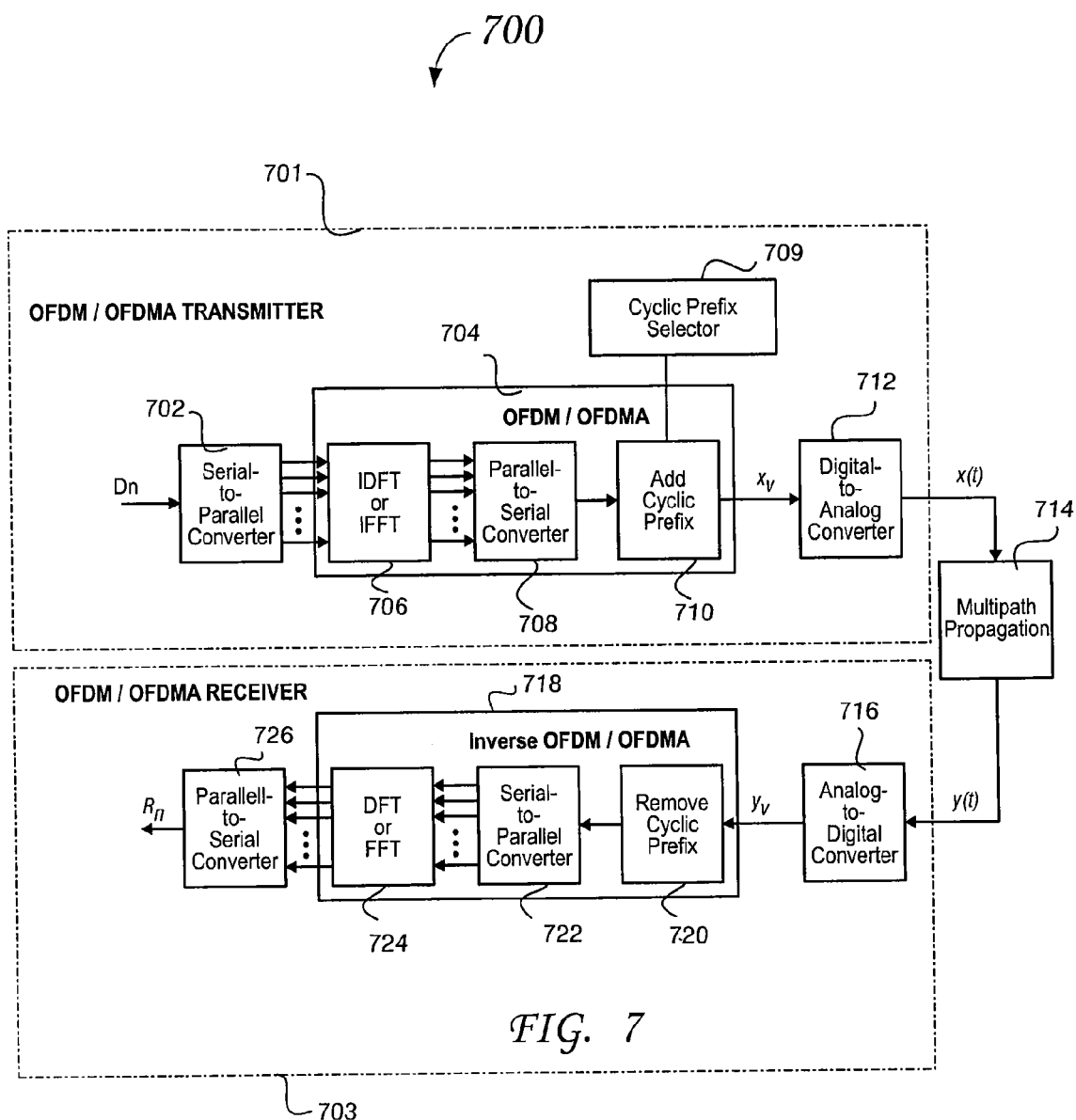
FIG. 7 is an illustration of an exemplary OFDM/OFDMA digital transceiver according to an embodiment of the invention.

FIG. 7 is a block diagram of an exemplary OFDM/OFDMA transceiver system 700 (e.g., transceivers 602 or 608 in FIG. 6) that can be configured in accordance with an exemplary embodiment of the invention. FIG. 7 represents a method for adding an efficiently sized cyclic prefix to an OFDM/OFDMA frame structure operable to effectively utilize OFDM/OFDMA channel transmission bandwidth. It is understood that, the system 700 may include additional components and elements configured to support known or conventional operating features. For the sake of brevity, conventional techniques and components related to digital signal processing such as channel encoding/decoding, correlation techniques, spreading/dispreading, pulse shaping, radio frequency (RF) technology, and other functional aspects and the individual operating components of the system 700 are not described in detail herein. The OFDM/OFDMA system 700 digitally transmits and receives data wirelessly to and from infrastructure devices using IFFT/FFT techniques. A discrete Fourier transform (DFT) and an inverse discrete Fourier transform (IDFT) may be used as an alternative to an FFT and IFFT respectively.

The OFDM/OFDMA digital transceiver system 700 includes a transmitter 701 and a receiver 703. The transmitter 701 further includes a serial-to-parallel converter 702, an OFDM/OFDMA module 704, and a digital-to-analog converter (D/A) module 712. The OFDM/OFDMA module 704 includes an IDFT/IFFT module 706, a parallel-to-serial converter 708, and an add cyclic prefix module 710 coupled to a cyclic prefix selector 709. The receiver 703 includes an analog-to-digital converter (A/D) module 716, an inverse OFDM/OFDMA receiver module 718, and a parallel-to-serial converter 726. The inverse OFDM/OFDMA receiver module 718 includes a remove cyclic prefix module 720, a serial-to-parallel converter 722, and a DFT/FFT module 724. In this example, the transmitter 701 and the receiver 703 can send and receive data and other communication signals via a multipath propagation channel 714 or other channels (e.g., 614 in FIG. 6).

Figure 2:
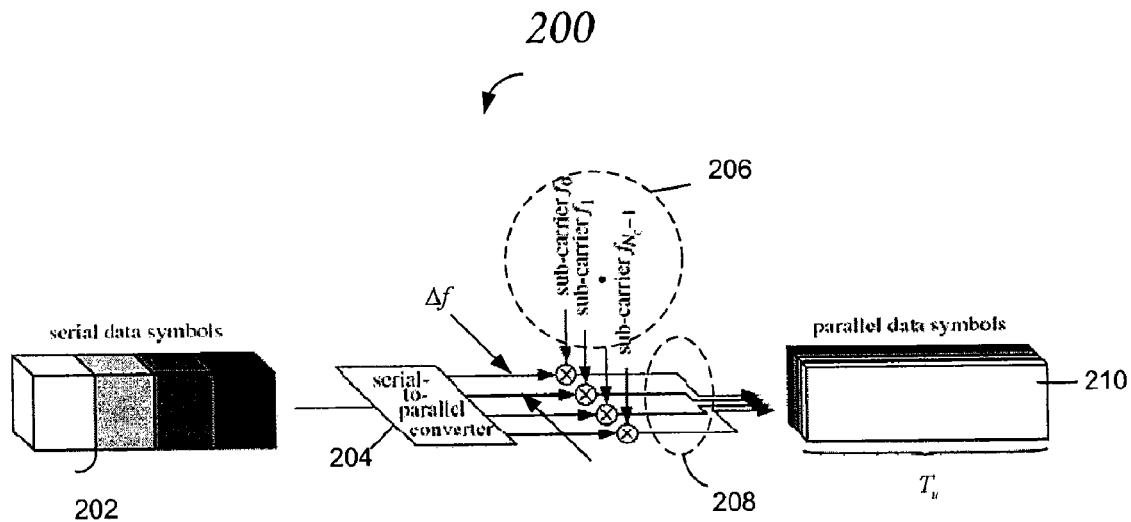
FIG. 2 is an illustration of principles of an OFDM/OFDMA multicarrier transmission with four subcarriers.
Figure 3:
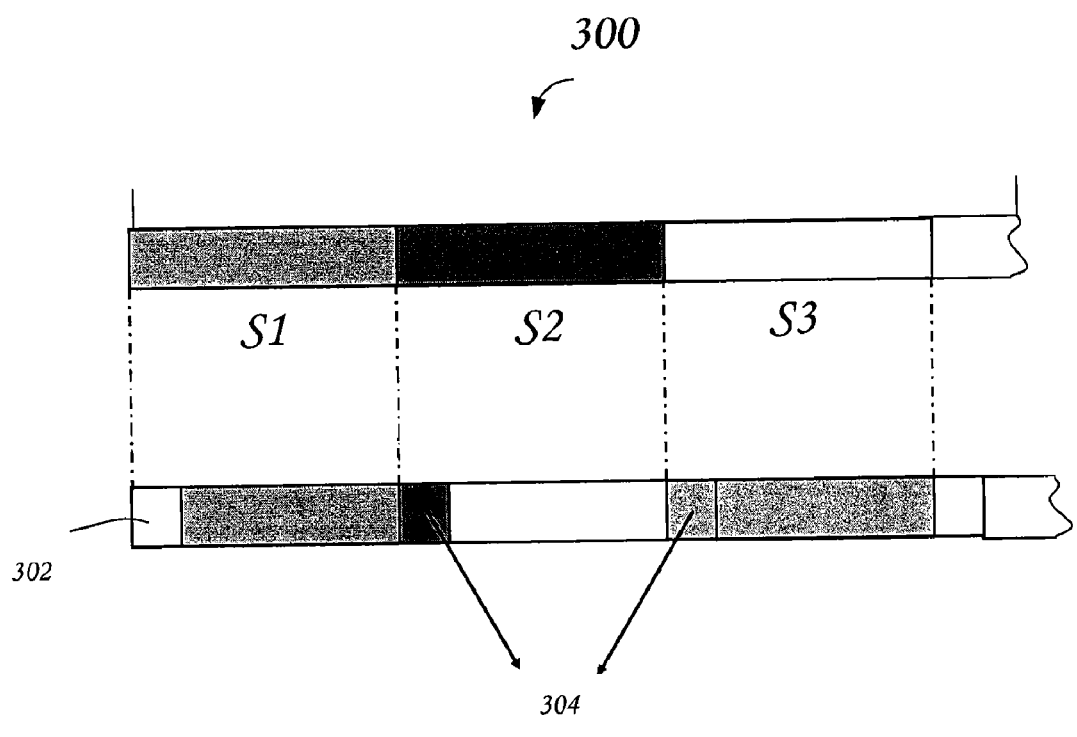
FIG. 3 is an illustration of exemplary OFDM/OFDMA symbols distorted due to ISI.

In the transmitter 701, a serial stream of $N_C$ source data symbols $D_n$ (corresponding to serial data symbols 202 in FIG. 2) is converted into $N_C$ parallel data symbols (corresponding to parallel data symbols 210 in FIG. 2) by the serial-to-parallel converter 702. The source data symbols $D_n$ may, for example, be obtained from an original data source (e.g., a text message) after source and channel coding, interleaving, and symbol mapping. After serial to parallel conversion 702, the source data symbol duration $T_d$ of the $N_C$ serial data symbols results in the OFDM/OFDMA symbol duration $T_u = N_C * T_d$.

The parallel data symbols are then modulated on to $N_C$ different sub-carriers (206 in FIG. 2) via the IDFT/IFFT module 706. As explained above, an OFDM system modulates the $N_C$ parallel data sub-streams on to $N_C$ sub-carriers (206 in FIG. 2). The $N_C$ sub-carriers have a frequency spacing of $$\Delta f = \frac{1}{T_u}$$

in order to achieve orthogonality between the signals on the $N_C$ sub-carriers. The $N_C$ parallel modulated signals form an OFDM symbol (210 in FIG. 2). Depending on the transmission media and the network bandwidth, system 700 can employ, for example, 64 to 4096 subcarriers as explained in more detail below.

Figure 4:
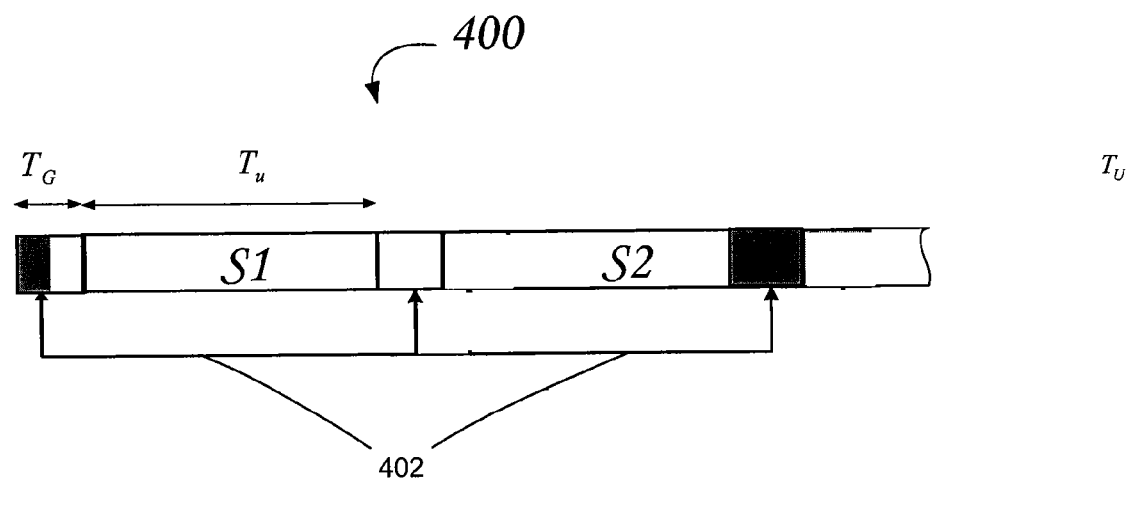
FIG. 4 is an illustration of exemplary OFDM/OFDMA symbols with cyclic prefix insertions in the time domain.
Figure 5:
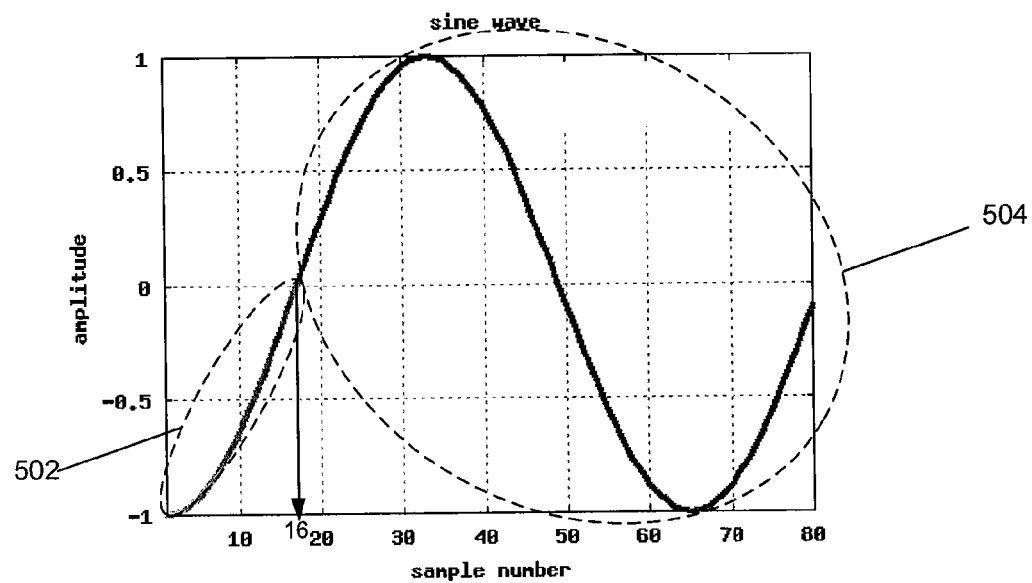
FIG. 5 is an illustration of an exemplary cyclic prefix extension to an OFDM/OFDMA symbol in the frequency domain.

The add cyclic prefix module 710 is then used to add a cyclic prefix to the output of the parallel-to-serial converter 708. In order to completely avoid or significantly reduce the effects of ISI, a cyclic prefix of duration $T_G$ may be inserted between adjacent OFDM/OFDMA symbols (402 in FIG. 4). The cyclic prefix duration parameter $T_G$ may be set to various values in order to efficiently size the cyclic prefix to effectively utilize OFDM/OFDMA bandwidth. As explained above, a cyclic prefix is a cyclic extension of each OFDM symbol which is obtained by extending the duration of an OFDM symbol to $T_{SYM} = T_u + T_G$ in accordance with one embodiment of the invention.

For example, according to an embodiment of the invention, the cyclic prefix values are selected based on RF channel conditions. In this manner, the cyclic prefix is configurable even if a system is deployed, thereby allowing efficient use of bandwidth. Accordingly, a communication system can select various effective cyclic prefix lengths for the base stations in a network, and may support different cyclic prefix lengths for different base stations in the network. Furthermore, a communication system may support different cyclic prefix lengths in different downlink and/or uplink sub-frames for the same base station. A variable cyclic prefix length allows a base station to change or configure the cyclic prefix duration for different communication usage scenarios, thereby increasing the bandwidth efficiency (bit/Hz) of the system. For example, when communication is in a channel with a severe multipath (i.e., larger delay spread), longer cyclic prefixes can be used to eliminate the ISI and ICI. In less severe channel conditions with fewer multipaths, a short cyclic prefix can be used in order to increase data rate (bits/sec), and to reduce overhead and transmission power.

The add cyclic prefix module 710 may receive the cyclic prefix values from the cyclic prefix selector 709. The cyclic prefix selector 709 may communicate with the processor 622 and or the memory module 620 to obtain values for the cyclic prefix. For example, the value may correspond to the cyclic prefix duration needed for base station coverage. The cyclic prefix selector 709 will then provide the appropriate cyclic prefix value to the add cyclic prefix module 710. For example, the cyclic prefix duration can be associated with multipath delay spread. When a Femto base station is deployed, for example, due to low transmit power of the base station power amplifier (PA) it only covers a small area or a hot-spot. The delay spread becomes very small and therefore this Femto BS and the associated mobile stations should select a small cyclic prefix (out of the different length options) for the downlink and uplink sub-frames transmission. On the other hand, if a Macro base station is deployed, due to the large transmit power of the base station power amplifier (PA), the base station can group the serving mobile stations into different groups by their delay spreads (determined by base station or requested by individual mobile station). The base station can allocate these different groups of mobile stations into different sub-frames with appropriate settings of cyclic prefixes. The cyclic prefix is just a copy of the end portion of the useful symbol ($T_u$), it is calculated and copied on the fly. The cyclic prefix values may be chosen to efficiently size the cyclic prefix to effectively utilize OFDM/OFDMA bandwidth, while providing a frame structure compatible with multiple wireless communication systems. The specific cyclic prefix values that are used are discussed below in the context of discussion of FIGS. 14-26.

The output of the add cyclic prefix module 710 is then passed through the D/A 712 to create an analog signal for transmission. The output of D/A 712 comprises the signal waveform X(t) with duration $T_{SYM}$. The signal waveform X(t) is up converted (not shown) and the RF signal is transmitted to the channel 714.

The output of the channel 714, after RF down conversion (not shown), is the received signal waveform Y(t) which may include ISI from the channel and RF processing. The received signal Y(t) is passed through analog-to-digital convert 716, whose output sequence $Y_v$ is the received signal Y(t) sampled at rate $$\frac{1}{T_d}.$$

A sampling rate of $$\frac{1}{T_d}$$

or greater is necessary to insure proper Nyquist sampling for the data rate of the data symbols $D_n$ with duration $T_d$.

Since ISI may be present within the cyclic prefix time period, cyclic prefix samples are removed via remove cyclic prefix module 720 before DFT/FFT demodulation. The ISI-free part of Y(t) may be converted to parallel data symbols via serial-to-parallel converter 722, and demodulated by DFT/FFT module 724. The output of the DFT/FFT module 724 is a sequence $R_n$, which is the received replica of the original data symbols $D_n$ along with any transmission errors. The receiver may incorporate other techniques which are not illustrated here, such as channel estimation, maximum receive ratio combining, etc.

Figure 8:
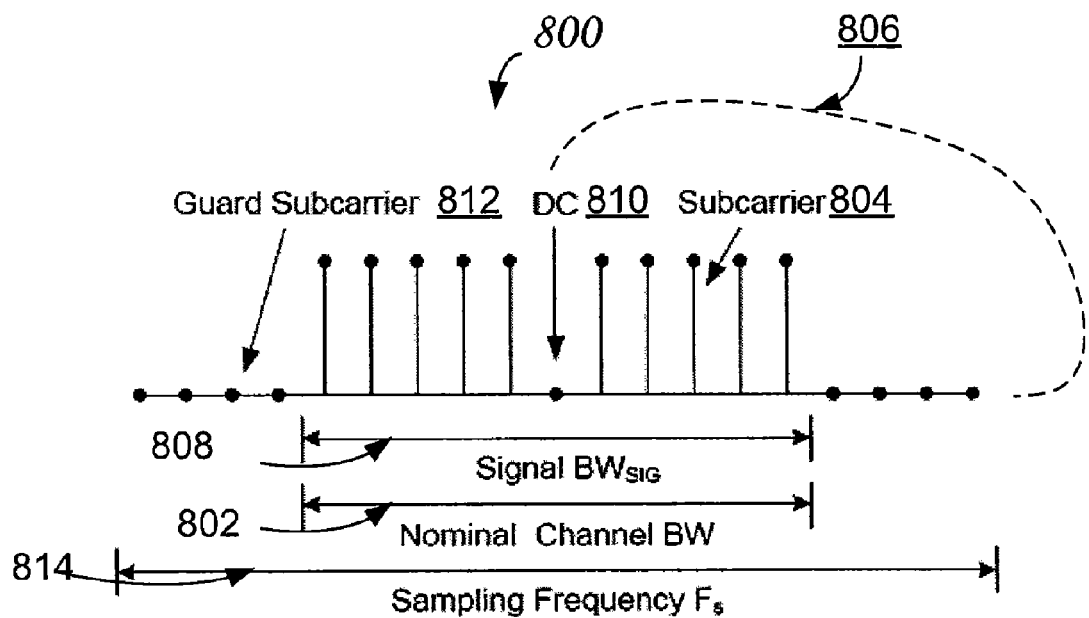
FIG. 8 is an illustration of an exemplary OFDM/OFDMA signal definition in the frequency domain.

FIG. 8 is an illustration of an exemplary OFDM/OFDMA signal frequency domain definition 800. As will be explained below, the choice of sub-carrier frequency in the OFDM/OFDMA signal frequency domain may be used, according to an embodiment of the invention, to insure frequency compatibility with wireless communication standards. The OFDM/OFDMA signal frequency domain definition 800 may comprise a nominal channel transmission bandwidth (BW) 802, a subset of signal subcarriers ($N_{SIG}$) 804, a signal bandwidth ($BWS_{SIG}$) 808, a DC sub-carrier (DC) 810, guard subcarriers 812, and a sampling frequency ($F_S$) 814. In some systems, the DC sub-carrier may not be defined.

For a given nominal channel transmission bandwidth (BW) 802, a subset of signal subcarriers 804 out of a plurality of subcarriers 806 may be used to match the bandwidth of the subcarriers 804 to the channel transmission bandwidth BW 802. The subset of signal subcarriers 804 is referred as signal bandwidth ($BW_{SIG}$) 808. The plurality of subcarriers 806 may include the DC sub-carrier (DC) 810, which contains no data. Subcarriers outside the signal bandwidth ($BW_{SIG}$) 808 that are not used may serve as guard subcarriers 812. The purpose of the guard subcarriers 812 is to enable the signal to have a smooth roll off in the time domain.

Figure 9:
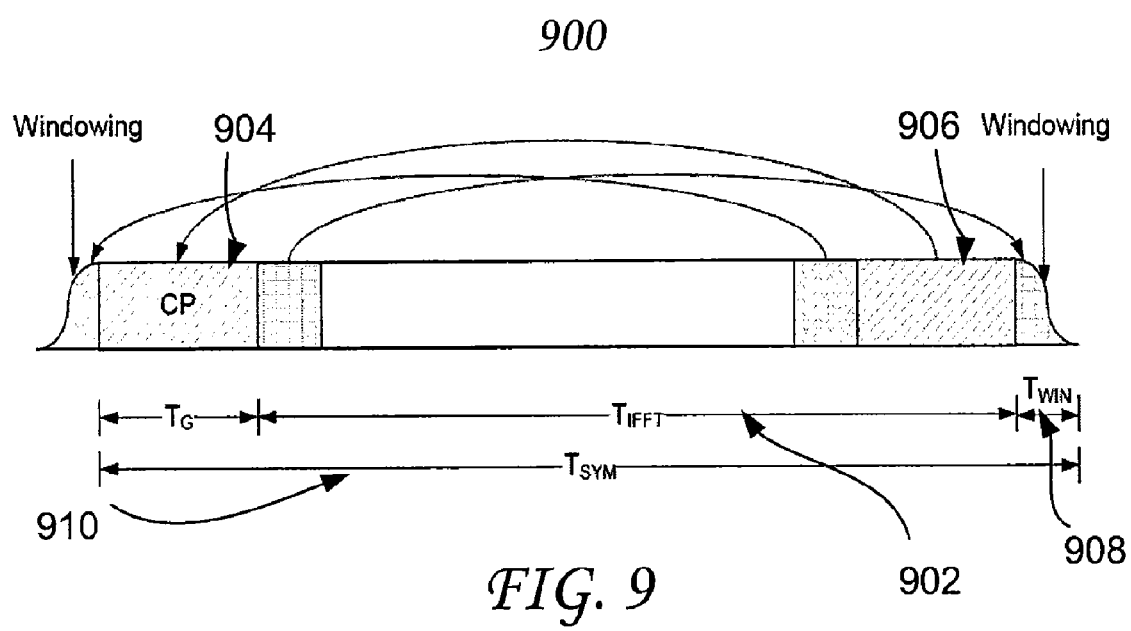
FIG. 9 is an illustration of an exemplary OFDM/OFDMA symbol structure in the time domain.

FIG. 9 is an illustration of an exemplary time domain symbol structure of an OFDM/OFDMA signal. FIG. 9 illustrates the positioning of a cyclic prefix in the exemplary time domain OFDM symbol. The time domain symbol structure 900 comprises a useful symbol time ($T_u$ or $T_{IFFT}$) 902, a cyclic prefix 904, a windowing period ($T_{WIN}$) 908, and a total symbol time ($T_{SYM}$) 910. In some systems, the windowing period may not be defined, which can be treated as windowing period having a value of zero: $T_{WIN}=0$.

A time duration of a set of OFDM data symbols to be transmitted by an OFDM/OFDMA system is referred to as the useful symbol time ($T_u$ or $T_{IFFT}$) 902. A copy of the end section of the symbol period 906 is used to produce the cyclic prefix (CP) 904. By using a cyclic extension, the samples used to perform the FFT at the receiver can be taken anywhere over the length of the extended symbol. This provides multipath immunity as well as a tolerance for symbol time synchronization errors. A small windowing period ($T_{WIN}$) 908 can be added before the cyclic prefix 904 and at the end of symbol time 902 to reduce signal in-band and out-of-band emission. In this example, the total symbol time ($T_{SYM}$) 910 may include the useful symbol time ($T_u$ or $T_{IFFT}$) 902, the cyclic prefix duration $T_G$ 904, and a windowing period ($T_{WIN}$) 908. An inverse Fourier transform (IFFT) of a set of OFDM data symbols in the time duration $T_{SYM}$ creates an OFDM/OFDMA waveform.

As explained above, many interference sources such as ISI, ICI, and multipath, can have an effect on OFDM/OFDMA system performance. Furthermore, the choice of the frame structure and the parameters that define the frames may also determine the performance of an OFDM/OFDMA system. A tradeoff must generally be made between resistance to interference and data transmission capacity. The tradeoff is determined by the choice of the parameters of the radio frames. For example, a long cyclic prefix may improve the multipath performance, but reduce the overall throughput of the system and overall frequency efficiency.

Figure 10:
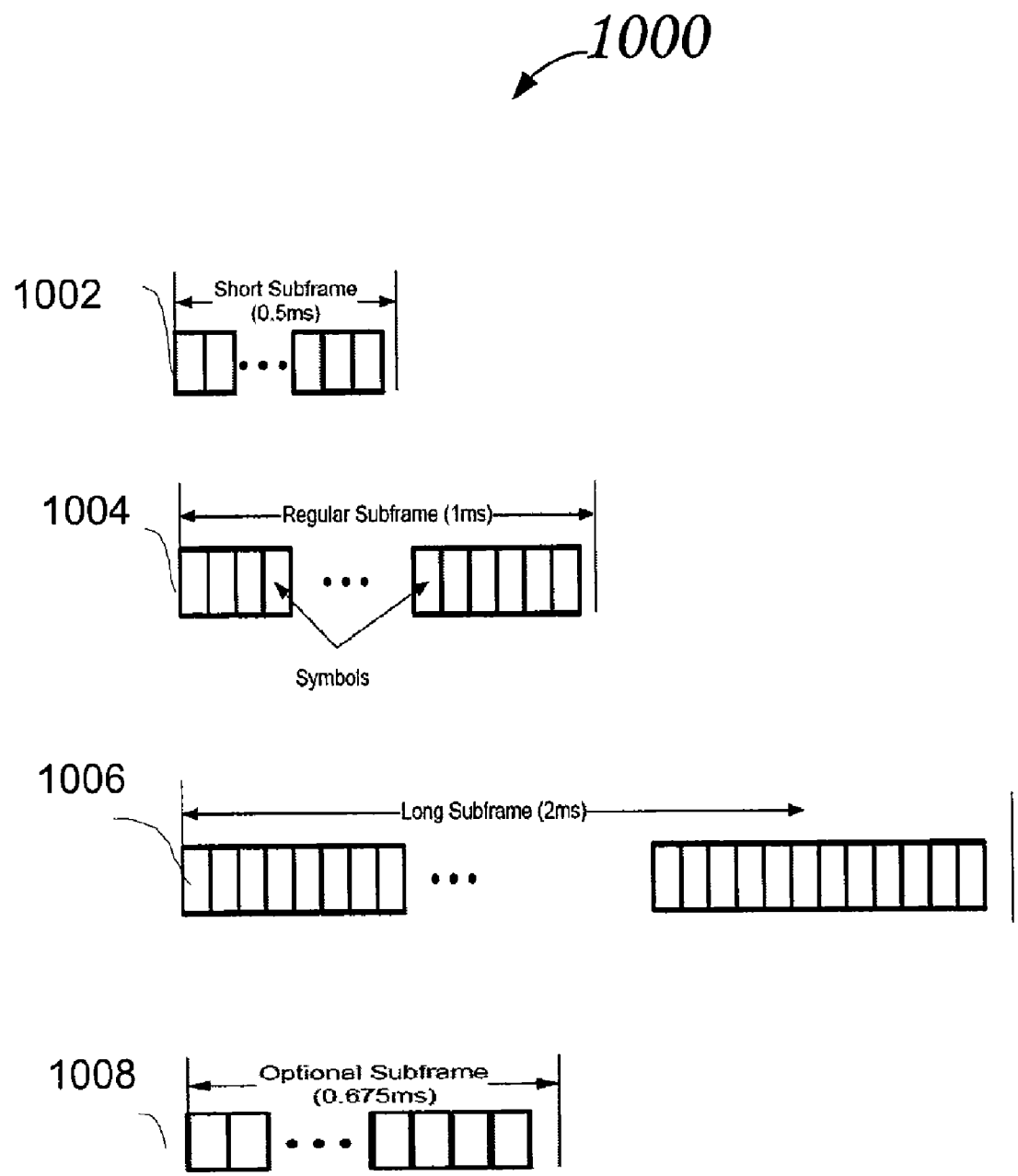
FIG. 10 is an illustration of an exemplary OFDM/OFDMA sub frame structure according to an embodiment of the invention.

FIG. 10 is an illustration of an exemplary OFDM/OFDMA sub-frame structure according to an embodiment of the invention. For this example, the OFDM/OFDMA sub-frame structure comprises a short sub-frame 1002, a regular sub-frame 1004, a long sub-frame 1006, and an optional low chip rate (LCR) sub-frame 1008. A 10 ms radio frame may be divided into twenty or more short sub-frames 1002, ten regular sub-frames 1004, or five long sub-frames 1006. For a 10 ms radio frame divided in this way, a short sub-frame 1002 has a duration of 0.5 ms, a regular sub-frame 1004 has a duration of 1 ms, and a long sub-frame 1006 has a duration of 2 ms. Other numbers of sub-frames that don't necessarily divide the 10 ms radio frame evenly may also be used. In this case, a gap remains in the radio frame. For example, a long sub-frame may have six long sub-frames each with a duration of 1.5 ms. Then, the total time of the sub-frames is 9 ms, which leaves a gap of 1 ms in the radio frame. The optional low chip rate sub-frame 1008 may also be used. A low chip rate sub-frame 1008 may have a duration of 0.675 ms, and a 10 ms radio frame may be divided into 14 or more low chip rate sub-frames 1008 with a 0.55 ms gap. These sub-frame duration options may allow a communication system such as the system 600 to reduce interference with other systems that are based on various industry standards as mentioned in the context of FIG. 6 above.

The frame structure provides compatibility with multiple wireless communication systems. For example, the low chip rate sub-frame 1008 duration of 0.675 ms may allow compatibility with the Time Division-Synchronous Code Division Multiple Access (TD-SCDMA) OFDM/OFDMA radio frame structure. The long sub-frame 1006 duration of 2 ms may allow compatibility with the Third Generation Partnership Project Long Term Evolution (3GPP LTE) OFDM/OFDMA radio frame structure, and the like.

Figure 11:
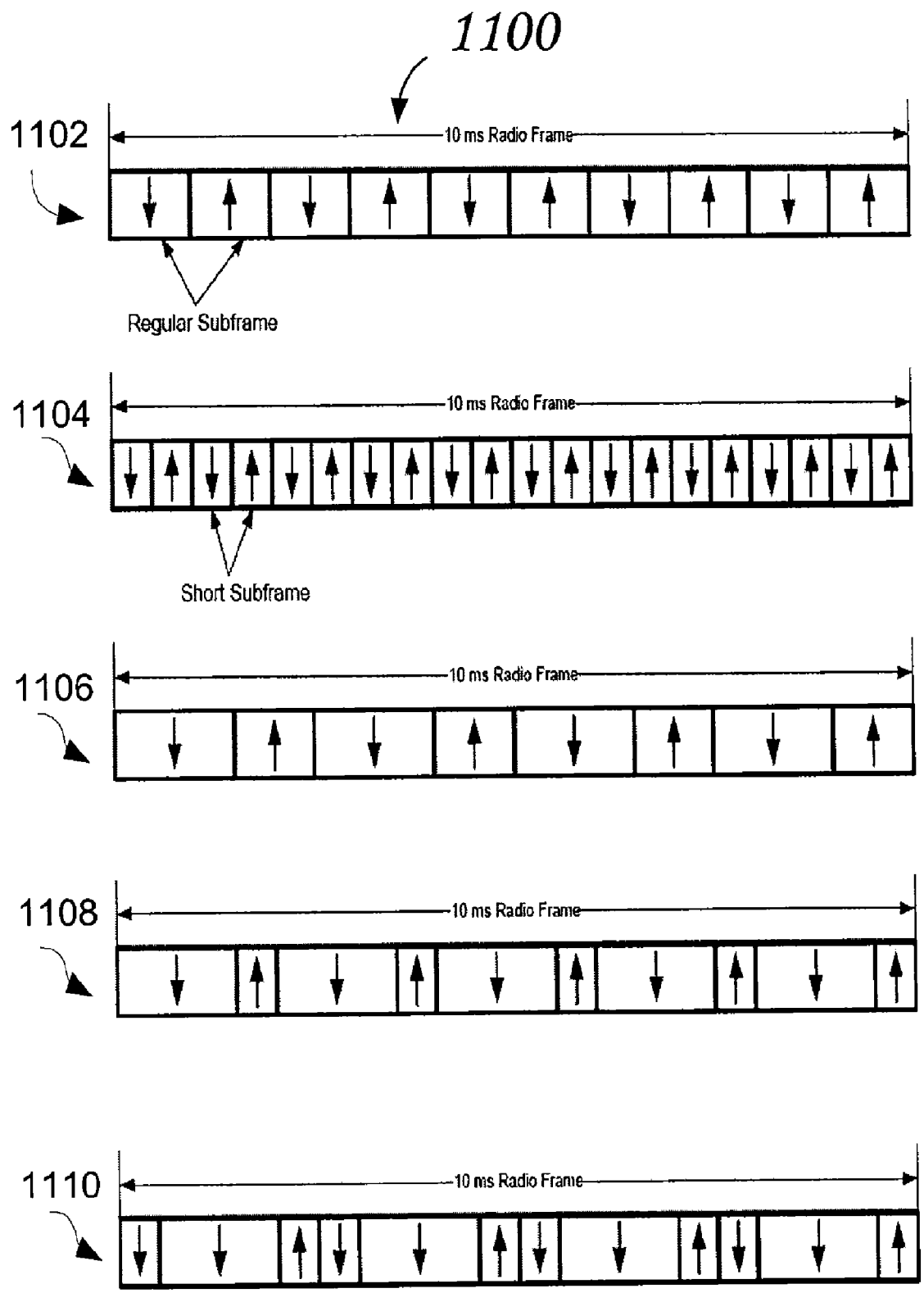
FIG. 11 is an illustration of an exemplary OFDM/OFDMA uplink and downlink radio frame structure according to an embodiment of the invention.

FIG. 11 is an illustration of an exemplary OFDM/OFDMA radio frame structure 1100 according to an embodiment of the invention. The OFDM/OFDMA radio frame structure 1100 may include five exemplary frame structures 1102, 1104, 1106, 1108, and 1112. The sub-frames may be allocated for uplink or downlink transmission. The first frame structure 1102 illustrates a series of alternating uplink regular sub-frames (shown by arrows pointing up) and downlink regular sub-frames (shown by arrows pointing down). The second exemplary frame structure 1104 illustrates a series of alternating uplink short sub-frames and downlink short sub-frames. This can give the same uplink data rate and downlink data rate, but in contrast to the first exemplary frame structure 1102, the second exemplary frame structure 1104 would have a lower overall data rate (bits/sec) because of an increase in overhead, and a lower latency because of the delay between sub-frames. Lower latency is useful for some applications like vocoders, where time delay is critical. The third exemplary frame structure 1106 illustrates a series of alternating uplink regular sub-frames and downlink long sub-frames. This can give a greater downlink data rate than uplink data rate. The fourth exemplary frame structure 1108 illustrates a series of alternating uplink short sub-frames and downlink long sub-frames. This can give an even greater downlink data rate than uplink data rate. The fifth exemplary frame structure 1110 illustrates a series of alternating downlink long sub-frames with a uplink short sub-frame and a downlink short sub-frame. This would be useful, for applications like an internet download, where small control commands alternate with large webpage downloads. In many real world situations, and particularly for multiple access systems like OFDMA, the frame synchronization on uplinks and downlinks to the various communicating devices may have timing variations.

Figure 12:
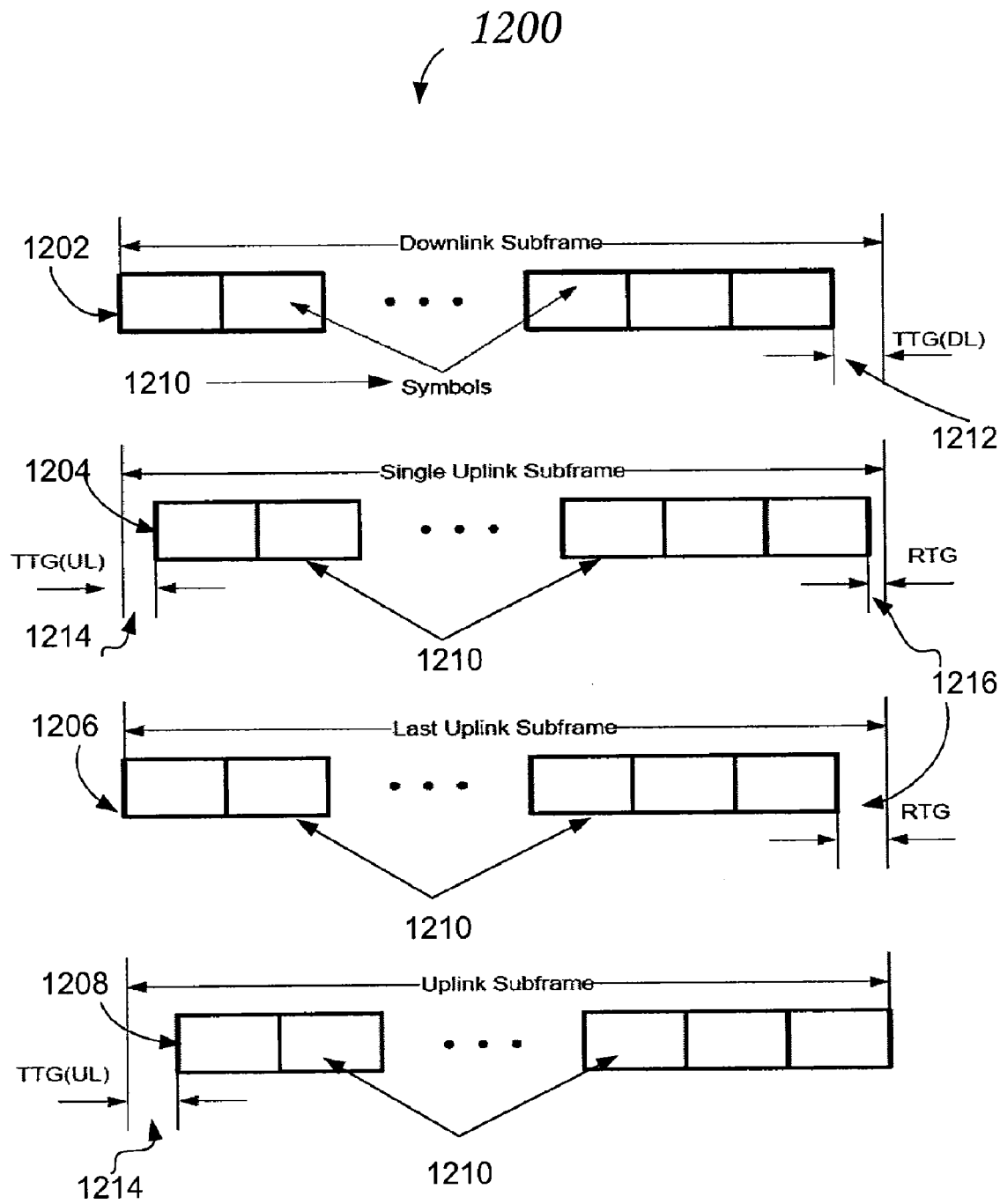
FIG. 12 is an illustration of an exemplary OFDM/OFDMA uplink and downlink sub-frame structure according to an embodiment of the invention.

FIG. 12 is an illustration of an exemplary OFDM/OFDMA uplink and downlink frame structure 1200 according to an embodiment of the invention. The OFDM/OFDMA uplink and downlink frame structure 1200 includes a downlink sub-frame 1202, a single uplink sub-frame 1204, a last uplink sub-frame 1206, and an uplink sub-frame 1208. Each sub-frame 1202/1204/1206/1208 includes a plurality of symbols 1210.

The downlink sub-frame 1202 has a transmission timing gap (TTG) for the downlink (TTG(DL)) 1212. Transmit and receive timing gaps exist as guard periods to protect against transitions from transmit to receive and vice versa in a TDD system. The TTG(DL) 1212 provides a protection for timing variations at signal reception, and allows sufficient time for a TDD system to transition from a downlink to an uplink. A TTG(DL) is a portion of the transmit/receive transition gap contributed from the downlink sub-frame.

For the single uplink sub-frame 1204, there is a transmission-timing gap at each end of the transmission for single uplink sub-frame 1204, since a single uplink sub-frame 1204 is both the start and end of its series in a frame. The single uplink sub-frame 1204 has a transmission timing gap for the uplink (TTG(UL)) 1214 and a receive-transmit transition gap (RTG) 1216 according to an embodiment of this invention. The TTG(UL) 1214 and RTG 1216 provide a protection for timing variations at signal reception, and the TTG(UL) 1214 allows sufficient time for a TDD system to transition from a downlink to an uplink. A TTG(UL) is the portion of the transmit/receive transition gap contributed from the uplink sub-frame. The RTG 1216 allows a TDD system (FIG. 6) time to transition from an uplink back to a downlink. Since the necessary timing gap period for RTG is often very short, it is optional in the system design. In some systems, RTG can be set to 0. In theory the base station may take up very small portion of the cyclic prefix time for switching from transmitting to receiving mode, but it is typically up to the base station to adjust when the uplink frame starts. In one embodiment, the uplink frame is sent in advance in time to offset propagation delay, therefore there is more than sufficient time for the mobile station to switch from transmitting mode to receiving mode without sacrificing the cyclic prefix for transaction. When RTG is set to 0, then the system design is further simplified, then "single uplink sub-frame" 1204 and "last uplink sub-frame" 1206 become the same design as "uplink sub-frame" with only TTG(UL) 1208.

If there is a series of uplink sub-frames in a frame, then uplink sub-frame 1208 starts the series and the last uplink sub-frame 1206 ends the series. The uplink sub-frame 1208 begins the series with a TTG(UL) 1214, which provides a time gap to allow a TDD radio system base station to transition from transmit mode to receive mode, and a TDD radio system mobile station to transition from receive mode to transmit mode. After the transition, subsequent sub-frames transmitted on the uplink may be sub-frames without time gaps. For the last sub-frame in the uplink series, a last uplink sub-frame 1206 is transmitted as explained above, which ends the series with the RTG 1216. The RTG 1216 provides a time gap to allow a TDD radio system base station to transition from receive mode to transmit mode, and a TDD radio system mobile station to transition from transmit mode to receive mode. According to an embodiment of the invention values for the TTG(DL) and TTG (UL) can be calculated based on the cyclic prefix duration as explained below in the context of discussion of FIG. 14.

Figure 13:
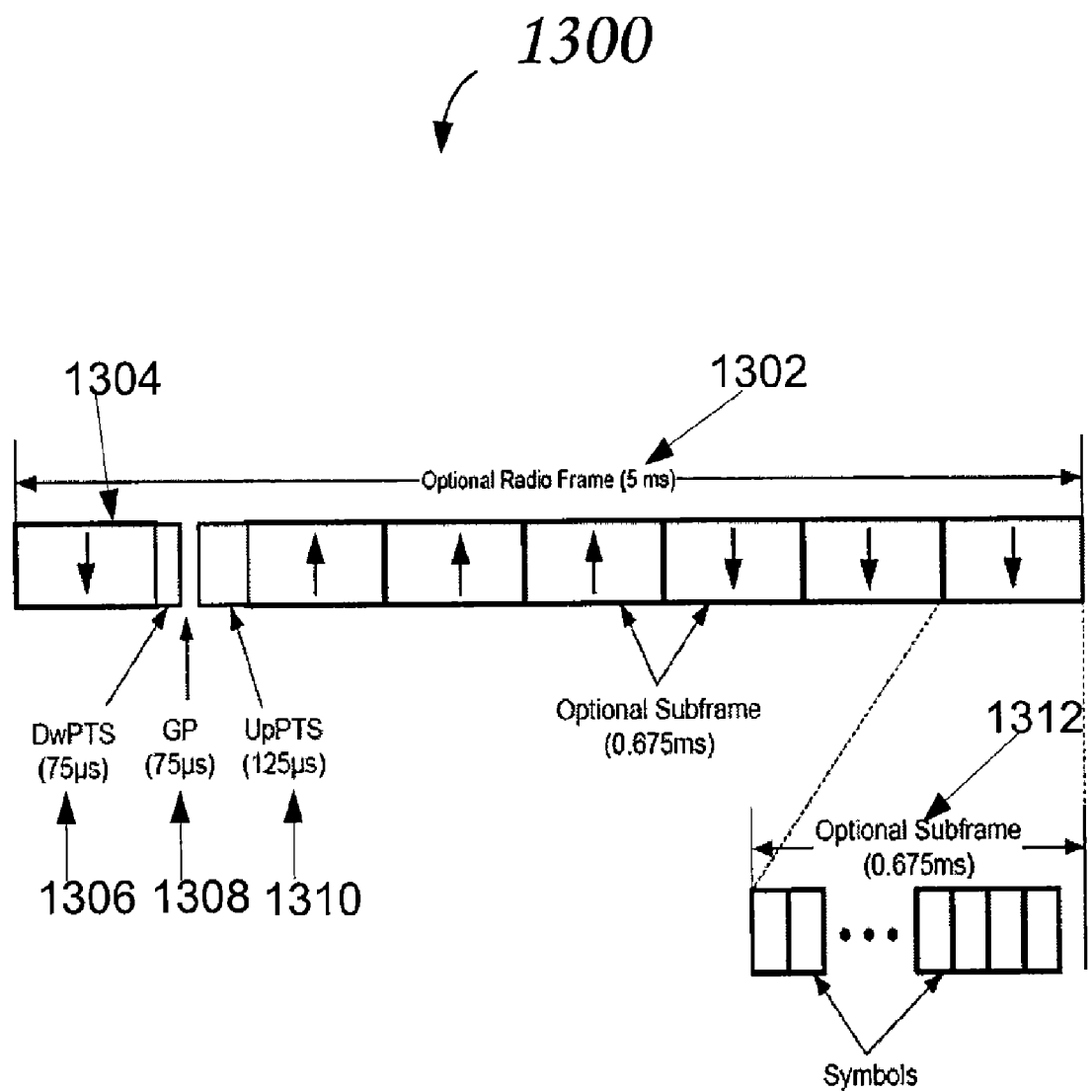
FIG. 13 is an illustration of an exemplary OFDM/OFDMA optional radio frame structure according to an embodiment of the invention.

FIG. 13 is an illustration of an exemplary OFDM/OFDMA optional radio frame 1300 according to an embodiment of the invention. The optional radio frame 1300 is 5 ms in length 1302. It starts with a 0.675 ms optional sub-frame 1304. Then a 75 μs downlink pilot (DwPTS) 1306 is transmitted. A 75 μs gap period (GP) 1308 is allowed between transmissions, and then a 125 μs transmitted uplink pilot (UpPTS) 1310 is transmitted. Then 0.675 ms optional sub-frame 1312 is transmitted up to the end of the frame 1300. In one embodiment of the invention, the DwPTS, GP, UpPTS are used to provide downlink and uplink transmission periods that are synchronized/lined-up with the TD-SCDMA for adjacent RF channel deployment.

FIGS. 14-26 illustrate exemplary tables of basic OFDM/OFDMA parameters for several channel transmission bandwidth series according to various embodiments of the invention. The OFDM/OFDMA parameters detail the variable length sub-frame parameters of the OFDM/OFDMA frame structure. As explained above, the frame structure may provide compatibility with multiple wireless communication systems using an efficiently sized cyclic prefix to efficiently utilize OFDM/OFDMA bandwidth. Note that numerology specified in these tables is for exemplary purposes only and other values for the OFDM/OFDMA parameters may be used.

FIG. 14 illustrates an exemplary table of basic OFDM/OFDMA parameters for a n×1.25 MHz bandwidth series according to an embodiment of the invention. A n×1.25 bandwidth series includes channel transmission bandwidths of 1.25, 2.5, 5, 10, 20, and 40 MHz based on multiples of 1.25 MHz. FIG. 14 shows sub-frame duration, subcarrier spacing, sampling frequency, FFT size $N_{FFT}$, number of occupied subcarriers, number of OFDM/OFDMA symbols per sub-frame, cyclic prefix durations of each of the sub-frames, and the cyclic prefix duration of the TTG(DL), TTG(UL), and RTG of each the sub-frames.

The FFT size $N_{FFT}$ may be the smallest power of two that is greater than the required number of signal subcarriers (804 in FIG. 8) needed for the sampling frequency $F_S$ (814 in FIG. 8) for the OFDM/OFDMA system. For example, for a transmission BW of 1.25 MHz, and a carrier spacing $\Delta f=12.5$ kHz, the required number of signal subcarriers (804 in FIG. 8) can be 100. Then, the FFT size $N_{FFT}$ is equal to 128 which is the smallest power of two (i.e., $2^7$) that is less than 100.

In this example, the FFT size $N_{FFT}$ is scalable from 128 to 4096. When the available channel transmission bandwidth BW increases, the $N_{FFT}$ also increases such that $\Delta f$ is constant. This keeps the OFDM/OFDMA symbol duration $T_u$ fixed, which is independent of channel system bandwidth BW. $T_{SYM}$ ($T_{SYM}=T_u+T_G$) is configurable based on different deployment scenarios, and therefore makes scaling have a minimal impact on higher layers. For example, a 7 MHz system may have the same performance as a 10 MHz system, except for that the maximum data throughput is proportional to the channel bandwidth (BW). A 5 MHz system can migrate to a 10 MHz system by adding another 5 MHz channel BW right next to it without a guard band and without causing adjacent channel interference by simply making all subcarriers orthogonal to each other. The migration can be done with the same base station and mobile station, as long the bandwidth filter has been designed for a 10 MHz channel. All frequency bands and rasters (200 KHz and 250 KHz) in the world can be divided by 12.5 KHz evenly, with no extra bandwidth and banding constraints. A scalable design also keeps the costs low.

In this example embodiment, an OFDM/OFDMA system with a fixed subcarrier spacing value $\Delta f=12.5$ kHz may be used. The $\Delta f=12.5$ kHz is chosen because it can not only divide the common channel raster of 200 KHz evenly, but also divide the alternative common channel raster of 250 KHz evenly. Thus, a frequency spacing of $\Delta f=12.5$ kHz can divide all RF channel evenly without unnecessary residue bandwidth. Additionally, the adjacent bands that are adopting the same technology will have minimum inter-channel interference (ICI), simply all adjacent sub-carriers are orthogonal to each other. Similarly $\Delta f=10$ kHz, 20 kHz, 25 kHz can serve the same purpose. The higher the $\Delta f$ is selected the higher the Doppler shift, often caused by mobility, the system can tolerate. As mentioned above, in the frequency domain an OFDM or OFDMA signal is made up of orthogonal subcarriers, and the number of used subcarriers may be less than or equal to the FFT size ($N_{FFT}$). For example, the FFT size ($N_{FFT}$) may be in a range comprising 128, 256, 512, 1024, 2048, or 4096 subcarriers.

The sampling frequency (e.g., $F_S$=1.6, 3.2, 6.4, 12.8, 25.6, and 51.2 MHz) can be calculated based on the $N_{FFT}$ and $\Delta f$ using the following equation:

$$F_S = \Delta f \times N_{FFT}$$

With this particular subcarrier spacing, RF channels with different channel transmission bandwidths are scalable. They can be defined with accordant used subcarriers within a fast Fourier transform size $N_{FFT}$. A subcarrier spacing of $\Delta f=12.5$ kHz has a property of good trade-off of cyclic prefix overhead with mobility support and achieving reasonable frequency efficiency.

For a given nominal channel transmission bandwidth BW (802 in FIG. 8) only a subset of subcarriers $N_{SIG}$ out of $N_{FFT}$ is occupied for signal bandwidth $BW_{SIG}$. For example, according to an embodiment of the invention the number of occupied subcarriers for a channel transmission bandwidth BW of 1.25, 2.5, 5, 10, 20, and 40 MHz can be 20, 100, 200, 400, 800, 1600 and 3200 respectively.

As explained above, in addition to the useful symbol duration $T_u$ which is available for user data transmission, an additional period of time $T_G$ can be used for transmission of a cyclic prefix. The cyclic prefix duration is prepended to each useful symbol duration $T_u$ and is used to compensate for the dispersion introduced by the channel response and by the pulse shaping filter used at the transmitter. Thus, although a total OFDM/OFDMA symbol duration of $T_{SYM}=T_u+T_G+T_{WIN}$ is employed for transmitting an OFDM symbol, the useful symbol duration:

$$T_u = \frac{1}{\Delta f}$$

is available for user data transmission. $T_u$ is therefore called the useful OFDM/OFDMA symbol duration. The windowing time period $T_{WIN}$ is optional, it can be set to 0 in some communication systems, such as the IEEE 802.16e version of WiMAX.

As mentioned above, in the existing systems the cyclic prefix is configurable, but it is fixed when a system is deployed, thereby constraining system configuration for efficient bandwidth utilization. In these existing systems, cyclic prefix length may not be variable and one type of cyclic prefix may exist. In this manner, existing systems may not allow a base station to change or configure the cyclic prefix duration to adjust to varying channel conditions.

According to one embodiment of the invention, for example, when a communication channel has a severe multipath delay spread (i.e., larger delay spread), a longer cyclic prefix duration can be used to eliminate the ISI. In a less severe channel conditions with less multipath delay spread, a short cyclic prefix can be used in order to reduce radio overhead and improve overall throughput and spectral efficiency. In this manner, various cyclic prefix types may be used for small, regular, and large cell site deployment as explained in more detail below. The various cyclic prefix types are referred to as Short, Normal, and Long respectively.

A cyclic prefix duration $T_G$ may be calculated based on the following relationship:

$$T_G = \frac{CP_{samples}}{F_S},$$

where $F_S$ is the sampling frequency as shown above and $CP_{samples}$ is the number of samples per cyclic prefix. Where, $CP_{samples} = T_G \times F_S$ can be obtained from knowing $T_G$ and $F_S$. The value of $T_G$ is selected in the particular sub-frame configuration, such as Short, Normal, or Long.

An initial $T_G$ (plus $T_{WIN}$) value may be selected for an initial channel. As shown in FIG. 14, at a 10 MHz channel one uplink sub-frame can be configured for Normal Cyclic Prefix (Normal CP), $T_G=10$ µs, in which $CP_{samples}$ may comprise 128 samples. Another uplink sub-frame could be configured for Short Cyclic Prefix (Short CP), $T_G=3.125$ µs, in which $CP_{samples}$ may comprise only 40 samples. For example, an initial Normal $T_G=10$ µs is selected based on a typical cell site coverage, and the downlink control channel, multicast and broadcast sub-frames and the Normal $T_G$ is used so that all mobile stations are able to listen to the base station. However, once the base station has identified that one or multiple mobile stations are close enough to the base station with small delay spreads, the base station can allocate these mobile stations to transmit in the uplink sub-frames with Short Cyclic Prefix (Short CP) $T_G=3.125$ µs. The base station can also transmit the unicast or multicast information so these mobile stations can also use a downlink sub-frame with Short Cyclic Prefix (Short CP) $T_G=3.125$ µs. For example, for a channel transmission bandwidth of 2.5 MHz and a Short cyclic prefix, a $CP_{samples}$ value of 10 (3.125×3.2) may be obtained. In this manner, for a given bandwidth series, $CP_{samples}$ may be scaled by the sampling frequencies so as to keep the cyclic prefix duration $T_G$ constant. For example, for a Short cyclic prefix, $CP_{samples}$ may be 5/10/20/40/80/160 for channel transmission bandwidth of 1.25/2.5/5/10/20/40 MHz respectively, while $T_G$ remains at 3.125 µs. A system with different bandwidths will have the same performance and user experience. In IEEE 802.16e version of WIMAX, a subscriber moves from a 7 MHz system to a 10 MHz system, $T_G$ is reduced accordingly with the bandwidth increase. The same subscriber may experience more dropped calls in the 10 MHz system. It has imposed great constraints on the cell site planning, and it is hard to maintain the same user experience across different bandwidth systems.

Alternatively, variable cyclic prefix durations may be chosen for a given channel transmission bandwidth based on the same sub-carrier spacing $\Delta f=12.5$ kHz. For example, cyclic prefix durations of $T_G \approx 3.125/10/16.875$ µs may be chosen for the Short, Normal, and Long cyclic prefixes respectively. These cyclic prefix durations can be used for small, regular, and large cell site deployment as explained above. Selecting different cyclic prefixes for OFDM/OFDMA symbols in a sub-frame for a base station allows for supporting different types of base station cells and cell coverage areas. Thereby, network deployment may be simplified by eliminating the need for the entire network to select the same cyclic prefixes regardless of the different requirements on each base station for its cell coverage area.

For a TDD system, downlink and uplink radio propagation are reciprocal, the base stations can detect and determine whether a smaller size of cyclic prefix is sufficient for a particular mobile station. On the other hand, a mobile station also can measure the downlink signals from a base station to determine what size of cyclic prefix is sufficient for the uplink transmission. The mobile station can report to the base station the preferred size of the cyclic prefix.

Different sub-frame (e.g., Short, Reg., Long) durations $T_{Sub-frame}$ can be designed based on different cyclic prefix durations such as Short, Normal, and Long cyclic prefix durations. For example, in FIG. 14 sub-frame durations may be $T_{Sub-frame}=0.5, 1,$ and 1.5 ms for the Short, Regular, and Long durations respectively. Also in FIG. 14, the cyclic prefix duration $T_G+T_{WIN}$ for a 1.25 MHz channel transmission bandwidth may be approximately 3.125/10/16.875 µs for Short, Normal, and Long cyclic prefix durations respectively. Accordingly, useful bandwidth can be allocated for data transmission instead of cyclic prefix transmission, thereby increasing the bandwidth efficiency (bits/Hz). In this manner, the overhead from the cyclic prefix duration can be minimized.

For a given $T_{Sub-frame}$ and cyclic prefix type, the number of OFDM/OFDMA symbols per sub-frame ($N_{SYM}$) can be a function of the sampling frequency $F_S$ and FFT size $N_{FFT}$. $F_S$ and $N_{FFT}$ may be chosen so that $N_{SYM}$ can remain the same across the bandwidth series. For example, for a 1.25 MHz transmission bandwidth $N_{SYM}$ may be calculated based on the following relationship:

$$N_{SYM} < \frac{T_{Sub-frame} \times F_s - \frac{1}{2} TTG_{min\;samples}}{N_{FFT} + CP_{sample}} = \frac{1.5 \times 1000 \times 1.6 - 5}{128 + 5} = 18.01$$

When the carrier spacing $\Delta f$ is fixed, the length of the useful symbol duration becomes constant, $$T_u = \frac{1}{\Delta f}.$$

For a given cyclic prefix duration, the length of symbol duration is also determined (assuming $T_{WIN}=0$), $$T_{SYM} = T_u + T_{WIN} + T_G = \frac{1}{\Delta f} + T_G.$$

For a given sub-frame duration $T_{Sub-Frame}$, the $T_{Sub-Frame}$ comprises transmission time and idle time. The transmission time is occupied by radio signal of multiple of symbols, $N_{SYM} \times T_{SYM}$. The leftover idle time is used for transmit transition gap (TTG) time $TTG_{Sub-Frame}$ and receive transition gap (RTG) time $RTG_{Sub-Frame}$, the latter is typically applicable to only uplink sub-frame. The value of RTG is often small. The number of OFDM/OFDMA symbols per sub-frame ($N_{SYM}$) can be calculated as following:

$$N_{SYM} = \frac{T_{Sub-frame} - TTG_{Sub-frame} - RTG_{Sub-frame}}{\frac{1}{\Delta f} + T_G}$$

In the table of FIG. 25, a sub-frame length of 1.5 ms $T_{Sub-Frame}=1500$ µs is used as an example to demonstrate how the number of symbols in the sub-frame is calculated. Since Δf is fixed at 12.5 kHz, $$T_u = \frac{1}{\Delta f} = 80 \text{ μs},$$

we can pick a Normal CP $T_G=10\mu$ for this sub-frame. We can also assume $RTG_{Sub-Frame}=0$, and $TTG_{Sub-Frame}>10\mu$ to accommodate additional propagation delays to derive the following relationship:

$$N_{SYM} = \frac{T_{Sub-frame} - TTG_{Sub-frame} - RTG_{Sub-frame}}{\frac{1}{\Delta f} + T_G} < \frac{1500 - 10 - 0}{80 + 10} = 16.56$$

In one embodiment, the number of symbols in the sub-frame is 16, as shown in the table of FIG. 25.

From this example, regardless of the size of the transmission bandwidth to 5 MHz to 20 MHz, the number of symbols in a particular sub-frame is the same when a particular CP length is chosen. For a particular deployment channel condition, a particular CP is chosen; the RF performance related to mobility for different transmission bandwidth remains roughly the same with the same RF overhead. The subscriber will enjoy the similar user experience in the system.

Additionally, as shown in the table of FIG. 25, the shorter the cyclic prefix the higher number of symbols can be fitted into a particular sub-frame, thereby providing higher throughput for the sub-frame. For a Pico or Femto cell deployment, the delay spreads and round trip delays are often small, so the base station and the associated mobile stations can be configured to transmit with short cyclic prefixes (Short CP) to improve frequency efficiency. For a Macro cell deployment, the coverage is often the important limitation. Due to high transmit RF power, Macro cell naturally have large cell site, which has increased the delay spreads and round trip delays for most radio signals. We can configure the base station and mobile stations and the associated mobile stations with long cyclic prefixes (Long CP) to combat rich multipath and large delay spread so as to reduce inter-symbol interference (ISI). The Femto Cells, Pico Cells, and Macro Cells can be deployed simultaneously and each can have optimized CP selections and frequency efficiency.

As discussed in relation to FIG. 12, the TTG(DL), TTG (UL), and RTG may vary based upon to the size of the sub-frame and the corresponding cyclic prefix. The processor modules 616/622 may be suitably configured to compute TTG (DL), TTG(UL) and the RTG values as follows:

The TTG (DL) may be calculated by using the following relationship:

TTG(DL)=(DL sub-frame duration)−(num of symbols in the DL sub-frame)*(OFDM/OFDMA symbol duration ($T_{SYM}$)), where OFDM/OFDMA symbol duration=(cyclic prefix duration ($T_G$))+(IFFT time ($T_u$))+(Windowing time ($T_{WIN}$))

Similarly, the TTG (UL) may be calculated by using the following relationship:

TTG(UL)=(UL sub-frame duration)−(num of symbols in the UL sub-frame)*(OFDM/OFDMA symbol duration ($T_{SYM}$)), where $T_{SYM}$ is calculated as shown above.

RTG is usually small and may be obtained by switching the time period from transmit to receive mode. If RTG is required in the system design, RTG should also be defined in a time unit which can be divided evenly by all sampling times. Using the table in FIG. 14 as an example, the minimum time unit is $T_S$=3.125/5=0.625 μs. RTG for Normal CP sub-frame is 1.25 μs in this particular example. Alternatively, RTG can also be set to zero for the sub-frame.

As shown in FIG. 14, the TTG(DL), TTG(UL), and RTG, for a Long sub-frame and a Short cyclic prefix (CP), may be 3.75 μs, 2.5 μs, and 1.25 μs respectively. Similarly, the TTG (DL), TTG(UL), and RTG, for the Long sub-frame and a Normal cyclic prefix, may be 60 μs, 58.75 μs, and 1.25 μs respectively, and so on.

OFDM/OFDMA parameters in FIGS. 15-26 may share same OFDM/OFDMA parameters definition and functionality as FIG. 14, therefore these definitions and the functionalities are not redundantly explained herein.

FIG. 15 illustrates an exemplary table of basic OFDMA parameters for a 3.5 bandwidth series (channel transmission bandwidths 3.25, 7, 14, 28, 56, and 112 MHz) according to an embodiment of the invention. The FFT size $N_{FFT}$ is scalable from 512 to 16384. Similar to the 1.25 bandwidth series explained above, an OFDM/OFDMA system with a fixed subcarrier spacing value Δf=12.5 kHz may be used for the 3.5 bandwidth series. As shown in FIG. 15, the sampling frequencies can be 6.4, 12.8, 25.6, 51.2, 102.4, and 204.8 MHz. For this example, the number of occupied subcarriers for channel transmission bandwidth BW of 3.25, 7, 14, 28, 56, and 112 MHz are 281, 561, 201, 1121, 2241, 4481 and 8961 respectively.

Variable cyclic prefix durations plus a windowing time (e.g., $T_G+T_{WIN}\approx2.97/10/16.72$ μs) can be chosen based on the same Δf≈12.5 kHz condition. The variable cyclic prefix durations are referred to as Short, Normal, and Long cyclic prefix respectively, and can be used for small, regular, and large cell site (FIG. 1) deployment. Different cyclic prefixes may be selected for OFDM/OFDMA symbols in a sub-frame (e.g., short, large, and long). Different sub-frames (e.g., Short, Regular, Long) durations $T_{Sub-frame}$ can be designed based on different cyclic prefix durations such as Short, Normal, and Long cyclic prefix durations respectively. For example, for $T_{Sub-frame}$=0.5, 1, and 1.5 ms (FIG. 8), MHz, the $T_G+T_{WIN}$ duration (overhead) for a 3.5 MHz channel transmission bandwidth may be about 2.96/10/16.875 μs respectively.

As mentioned above, according to an embodiment of the invention, the TTG(DL), TTG(UL), and RTG may vary based upon to the size of the sub-frame and the corresponding cyclic prefixes. For example, as shown in FIG. 15, the cyclic prefix duration of the TTG(DL), TTG(UL), and RTG, for a Long sub-frame and a Short cyclic prefix, may be about 6.56, 6.25, and 0.31 μs respectively. Similarly, the cyclic prefix duration of the TTG(DL), TTG(UL), and RTG, for the Long sub-frame and a Normal cyclic prefix, may be about 60 μs, 59.68 μs, and 0.31 μs respectively, and so on.

FIG. 16 illustrates an exemplary table of basic OFDM/OFDMA parameters for a 1.25 MHz bandwidth series showing additional optimized overhead ($T_G+T_{WIN}$) values that may be used according to embodiments of the invention. For example, overhead values for a 1.25 MHz channel transmission bandwidth BW may be about 2.5/9.3716.87 for a Short cyclic prefix, Normal cyclic prefix, and Long cyclic prefix respectively (compared to 3.125/10/16.875 μs in FIG. 14), and so on.

FIG. 17 illustrates an exemplary table of basic OFDMA parameters for a 3.5 bandwidth series showing additional overhead values that may be used according to embodiments of the invention. For example, $T_G+T_{WTN}$ durations that are similar to the 1.25 MHz bandwidth series explained above (FIG. 16), but are used for a 3.5 MHz bandwidth series.

FIGS. 18-23 are extensions of FIG. 16 showing values for the TTG (DL), TTG(UL) and RTG for 0.5, 0.675, 1, 1.25, 2, and 2.5 sub-frames according to various embodiments of the invention.

FIG. 18 illustrates an exemplary table of basic OFDM/OFDMA parameters for a 1.25 MHz bandwidth series with a 0.5 ms sub-frame according to an embodiment of the invention. As shown in FIG. 18, the duration for the TTG(DL), TTG(UL), and RTG for a 0.5 ms sub-frame and a Short cyclic prefix (2.5 μs), may be 5, 2.5, and 2.5 μs respectively. Similarly, the duration for the TTG(DL), TTG(UL), and RTG for a 0.5 ms sub-frame and a Long cyclic prefix (15 μs), may be about 112.5, 110, and 2.5 μs respectively, and so on.

FIG. 19 illustrates an exemplary table of basic OFDM/OFDMA parameters for a 1.25 MHz bandwidth series with a 0.675 ms sub-frame according to an embodiment of the invention. For example, as shown in FIG. 19, the duration for the TTG(DL), TTG(UL), and RTG for a 0.675 ms sub-frame and a Short cyclic prefix (2.5 μs), may be 15, 12.5, and 2.5 μs respectively. Similarly, the duration for the TTG(DL), TTG (UL), and RTG for a 0.675 ms sub-frame and a Long cyclic prefix (15 μs), may be 93.75, 91.25, and 2.5 μs respectively, and so on.

FIG. 20 illustrates an exemplary table of basic OFDM/OFDMA parameters for a 1.25 MHz bandwidth series with a 1 ms sub-frame according to an embodiment of the invention. For example, as shown in FIG. 20, the duration for the TTG (DL), TTG(UL), and RTG for a 1 ms sub-frame with a Short cyclic prefix (2.5 μs), may be 10, 7.5, and 2.5 μs respectively. Similarly, the duration for the TTG(DL), TTG(UL), and RTG for a 0.675 ms sub-frame and a Long cyclic prefix (15 μs), may be 31.25, 28.75, and 2.5 μs respectively, and so on.

FIG. 21 illustrates an exemplary table of basic OFDM/OFDMA parameters for a 1.25 MHz bandwidth series with a 1.5 sub frame according to an embodiment of the invention. For example, as shown in FIG. 21, the TTG(DL), TTG (UL), and RTG for a 1.5 ms sub-frame with a Short cyclic prefix (2.5 μs), may be 15, 12.5, and 2.5 μs respectively. Similarly, the duration for the TTG(DL), TTG(UL), and RTG for a 1.5 ms sub-frame and a Long cyclic prefix (15 μs), may be 46.875, 44.375, and 2.5 μs respectively, and so on.

FIG. 22 illustrates an exemplary table of basic OFDM/OFDMA parameters for a 1.25 MHz bandwidth series with a 2 ms sub frame according to an embodiment of the invention. For example, as shown in FIG. 22, the duration of the TTG (DL), TTG(UL), and RTG for a 2 ms sub-frame with a Short cyclic prefix (2.5 μs), may be 20, 17.5, and 2.5 μs respectively. Similarly, the duration for the TTG(DL), TTG(UL), and RTG for a 2 ms sub-frame and a Long cyclic prefix (15 μs), may be about 62.5, 60, and 2.5 μs respectively, and so on.

FIG. 23 illustrates an exemplary table of basic OFDM/OFDMA parameters for a 5 MHz bandwidth series with a 2.5 ms sub-frame for transmission in a channel with a channel transmission bandwidth BW of 20 MHz according to an embodiment of the invention. For example, as shown in FIG. 23, the duration of the TTG(DL), TTG(UL), and RTG for a 2.5 ms sub-frame with a Short cyclic prefix (2.5 μs), may be 25, 22.5, and 2.5 μs respectively. Similarly, the duration for the TTG(DL), TTG(UL), and RTG for a 2.5 ms sub-frame and a Long cyclic prefix (15 μs), may be about 78.125, 75.625, and 2.5 μs respectively, and so on.

Figure 26:
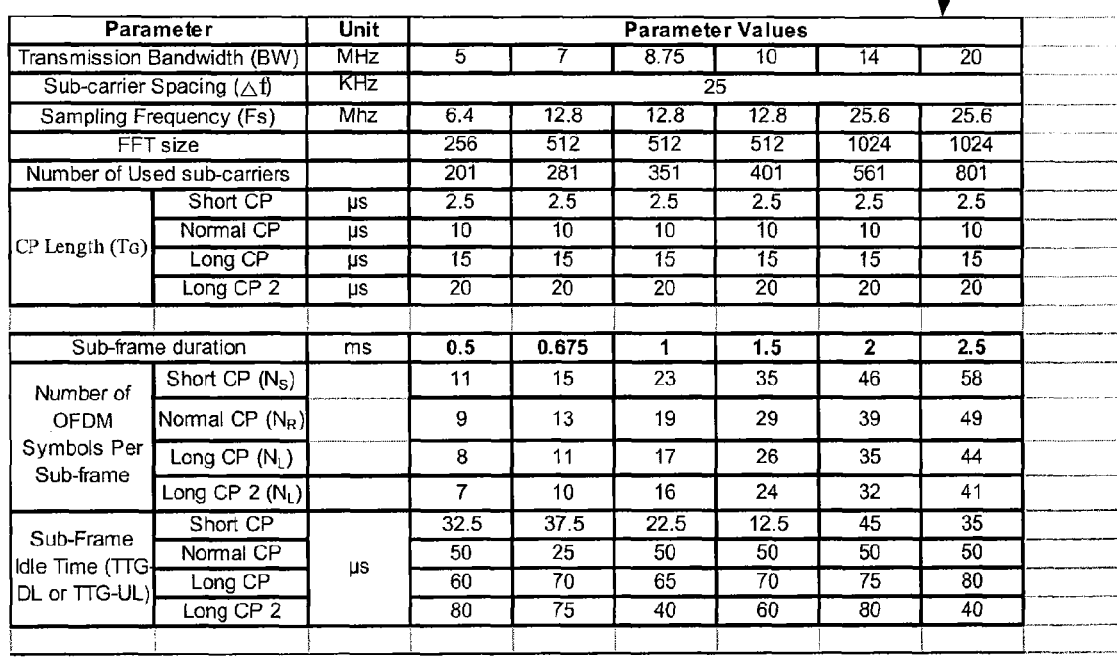
FIG. 26 is an illustration of an exemplary table of basic OFDM/OFDMA parameters for a 5 MHz bandwidth series, with a subcarrier frequency spacing Δf≈25 KHz, according to an embodiment of the invention.

Alternatively, systems 600 and 700 may operate with different fixed subcarrier spacing and hence provide different scalability properties. In this manner embodiments of the invention can offer compatibility with various communication systems. For example, FIGS. 24-26 illustrate exemplary tables of basic OFDM/OFDMA parameters for a 5 MHz bandwidth series (channel transmission bandwidths 5, 7, 8.75, 10, 14, and 20 MHz) for a sub-carrier spacing $\Delta f$=10.9375 KHz, 12.5 KHz, and 25 KHz. A sub-carrier spacing of $\Delta f$=10.9375 KHz corresponds to that used in IEEE 802.16e (WiMAX).

FIG. 24 illustrates an exemplary table of basic OFDMA parameters for a MHz bandwidth series for a sub-carrier spacing $\Delta f$=10.9375 which can not divide all the RF bandwidths evenly, therefore it is not a good choice according to embodiments of the invention. However, IEEE 802.16e version of Mobile WiMAX has chosen $\Delta f$=10.9375 kHz for 5 MHz and 10 MHz channel bandwidths deployment. For some backward compatibility consideration, $\Delta f$=10.9375 or $\Delta f$=21.875 kHz can be used for other channel bandwidths deployment for IEEE 802.16m version of future WiMAX. According to this embodiment of the invention, the FFT size $N_{FFT}$ is scalable from 512 to 2048. The sampling frequency (e.g., $F_S$=5.6, 11.2, 11.2, 11.2, 22.4, and 22.4 MHz) is calculated for the 5, 7, 8.75, 10, 14, and 20 MHz channel transmission bandwidths respectively as explained above. The number of occupied subcarriers for channel transmission bandwidths of 5, 7, 8.75, 10, 14, and 20 MHz may be 421, 589, 735, 841, 1177, 1681 respectively in this example. A Short cyclic prefix, a Normal cyclic prefix, a Long cyclic prefix, and another Long cyclic prefix (CP2) durations of 2.857, 11.428, 17.142, and 22.857 μs can be chosen for the 5 MHz bandwidth series.

Different sub-frames durations $T_{Sub-frame}$ can be designed based on different cyclic prefix durations such as Short, Long, and Normal cyclic prefix durations. For example, sub-frame durations may be $T_{Sub-frame}$=0.5, 0.675, 1, 1.5, 2, and 2.5, and the cyclic prefix duration for these sub-frames may be selected from the above cyclic prefix values. For example, for a 0.5 ms sub-frame duration at 5 MHz channel transmission bandwidth BW, a Short cyclic prefix of 2.857 μs can be selected thereby allowing 5 OFDM/OFDMA symbol per frame to be transmitted. The duration for the TTG(DL), TTG (UL), and RTG (FIG. 12) may vary based upon to the size of the sub-frames and the corresponding cyclic prefixes. For example, as shown in FIG. 25, for the 5 MHz bandwidth series, the duration for the TTG(DL) or TTG(UL), for a 0.5 ms sub-frame and a Short cyclic prefix (2.857 μs), may be 28.571 μs. Similarly, the duration for the TTG(DL) or TTG (UL), for a 0.5 ms sub-frame and a Long cyclic prefix (17.142 μs), may be 65.71 μs, and so on.

FIG. 25 illustrates an exemplary table of basic OFDM/OFDMA parameters for a 5 MHz bandwidth series according to an embodiment of the invention. In this example, the FFT size $N_{FFT}$ is scalable from 512 to 2048. A fixed subcarrier spacing value $\Delta f$=12.5 kHz (similar to the 1.25 bandwidth series) may be used for the 5 MHz bandwidth series.

The sampling frequency (e.g., $F_S$=6.4, 12.8, 12.8, 12.8, 25.6, and 25.6 MHz) is calculated for the 5, 7, 8.75, 10, 14, and 20 MHz channel transmission bandwidth BW respectively as explained above. For this example, the number of occupied subcarriers for channel transmission bandwidth BW of 5, 7, 8.75, 10, 14, and 20 MHz is 401, 561, 701, 801, 1121, 4481 and 1601 respectively. A Short cyclic prefix, a Normal cyclic prefix, a Long cyclic prefix, and another Long cyclic prefix (CP2) durations of 2.5, 10, 15, and 20 μs can be chosen for these channel transmission bandwidths.

Different sub-frames durations $T_{Sub-frame}$ can be designed based on different cyclic prefix durations such as Short, Long, and Normal cyclic prefix durations. For example, $T_{Sub-frame}$=0.5, 0.675, 1, 1.5, 2, and 2.5, and the cyclic prefix duration for these sub-frames may be selected from 2.5, 10, 15, and 20 µs cyclic prefix duration $T_G$ values. For example, for a 0.5 ms sub-frame duration at a channel transmission bandwidth of 5 MHz, a cyclic prefix duration of 2.5 µs can be selected. As mentioned above, the TTG(DL), TTG(UL), and RTG (FIG. 12) may vary based upon to the size of the sub-frame and the corresponding cyclic prefixes. For example, as shown in FIG. 18, for the transmission bandwidth BW of 5 MHz, the duration for the TTG(DL) or TTG(UL), for a 0.5 ms sub-frame and a Short cyclic prefix (2.5 µs), may be 5 µs. Similarly, the duration for the TTG(DL) or TTG(UL), for a 0.5 ms sub-frame and a Long cyclic prefix (15 µs), may be 120 µs, and so on.

FIG. 26 illustrates an exemplary table of basic OFDM/OFDMA parameters for a 5 MHz bandwidth series with a subcarrier spacing Δf≈25 KHz according to an embodiment of the invention. The FFT size $N_{FFT}$ is scalable from 256 to 1024 (e.g., 256, 512, 512, 512, 1024, and 1024). The sampling frequency (e.g., $F_S$=6.4, 12.8, 12.8, 12.8, 25.6, and 25.6 MHz) is calculated for the 5, 7, 8.75, 10, 14, and 20 MHz channel transmission bandwidths BW respectively as explained above. The number of occupied subcarriers for these channel transmission bandwidths can be 201, 281, 351, 401, 561, and 801 respectively. A Short cyclic prefix, a Normal cyclic prefix, a Long cyclic prefix, and another Long cyclic prefix (CP2) durations of 2.857 µs, 11.428 µs, 17.142 µs, and 22.857 µs can be chosen for these channel transmission bandwidths.

Different sub-frames durations $T_{Sub-frame}$ can be designed based on different cyclic prefix durations such as Short, Long, and Normal cyclic prefix durations. For example, sub-frame durations may be $T_{Sub-frame}$=0.5, 0.675, 1, 1.5, 2, and 2.5, and the cyclic prefix duration for these sub-frames may be selected from the above cyclic prefix values. For example, for a 0.5 ms sub-frame duration at 5 MHz bandwidth, a Short cyclic prefix of 2.5 µs can be selected thereby allowing 11 OFDM/OFDMA symbols per frame to be transmitted in this frame. The duration for the TTG(DL), TTG(UL), and RTG (FIG. 12) may vary based upon to the size of the sub-frames and the corresponding cyclic prefixes. For example, as shown in FIG. 26, for a channel transmission bandwidth of 5 MHz, the duration for the TTG(DL), or TTG(UL), for a 0.5 ms sub-frame and a Short cyclic prefix (2.5 µs), may be 32.5 µs. Similarly, the duration for the TTG(DL), or TTG(UL), for a 0.5 ms sub-frame and a Long cyclic prefix (15 µs), may be 60 µs, and so on.

Figure 27:
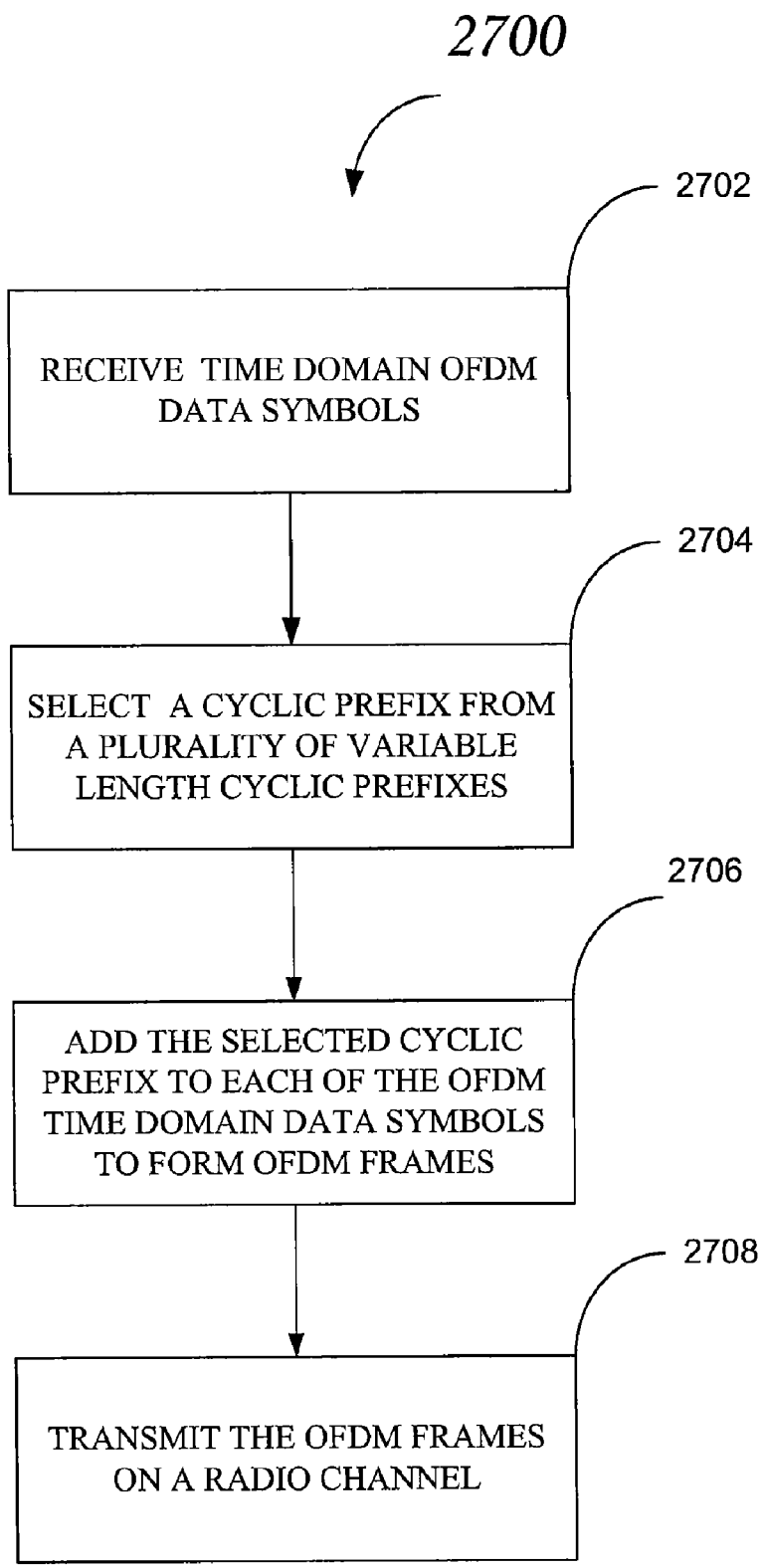
FIG. 27 is an illustration of a flowchart showing an OFDM/OFDMA process for creating a frame structure with a variable cyclic prefix, according to embodiments of the invention.

FIG. 27 illustrates a flowchart showing an OFDM/OFDMA process 2700 for creating a frame structure with a variable cyclic prefix according to embodiments of the invention. The various tasks performed in connection with these processes may be performed by software, hardware, firmware, a computer-readable medium having computer executable instructions for performing the process method, or any combination thereof. It should be appreciated that process 2700 may include any number of additional or alternative tasks. The tasks shown in FIG. 27 need not be performed in the illustrated order, and these processes may be incorporated into a more comprehensive procedure or process having additional functionality not described in detail herein. For illustrative purposes, the following description of process 2700 may refer to elements mentioned above in connection with FIGS. 6-26. In various embodiments, portions of process 2700 may be performed by different elements of systems 600-700 e.g., transceivers and processors. OFDM/OFDMA process 2700 may share same OFDM/OFDMA definitions and functionalities as explained above in the context of FIGS. 6-26, therefore these definitions and the functionalities are not redundantly explained herein.

Process 2700 may begin with the OFDM/OFDMA transmitter 701 receiving time domain OFDM data symbols for transmission on an RF channel (task 2702). Next, the cyclic prefix selector 709 selects a cyclic prefix from a plurality of variable length cyclic prefixes (task 2704). The cyclic prefix may be selected from a plurality of cyclic prefixes available for the RF channel. For example, as shown in FIG. 14, the RF channel may comprise a plurality of variable length cyclic prefixes that range from 5-864 samples for various channel transmission bandwidths in the RF channel.

As shown in FIG. 14, for a 1.25 MHz channel transmission bandwidth BW, a set of variable length cyclic prefix comprises a Short, a Normal and a Long cyclic prefix length comprising 5, 16, and 27 samples respectively. These cyclic prefixes may be scaled to obtain the set of cyclic prefixes for each of the other channel transmission BW (RF channels). For example, a short cyclic prefix (e.g., 5 samples) can be scaled to obtain a 10, 20, 40 and 80 samples for the channel transmission bandwidths BW of 2.5, 5, 10, 20, and 40 MHz respectively, and so on. For these channel transmission bandwidths, the cyclic prefix duration of 3.125 µs can then be calculated as explained above in the context of discussion of FIG. 14.

Process 2700 then adds the selected cyclic prefix into each of the time domain OFDM/OFDMA data symbols to obtain a plurality of OFDM frames (task 2706) using the add cyclic prefix module 710. The selected cyclic prefix may be in the form of digital samples of the corresponding cyclic prefix duration. Process 2700 may then transmits the OFDM frames on the radio channel such as the radio channel 714 (task 2708). In this manner, process 2700 adds the OFDM frames to a variable size sub-frame prior to transmitting the OFDM frames on the channel.

According to embodiments of the invention, these variable length cyclic prefixes can be used for small, regular, and large cell site deployment as explained above to improve bandwidth efficiency (bit/Hz) of the system. Furthermore, selecting different cyclic prefixes for OFDM/OFDMA symbols in a sub-frame for a base station allows for supporting different types of base station cells and cell coverage areas. Thereby, network deployment may be simplified and made more flexible by eliminating the need for the entire network to select the same cyclic prefixes regardless of the different requirements on each base station for its cell coverage area.

While various embodiments of the invention have been described above, it should be understood that they have been presented by way of example only, and not by way of limitation. Likewise, the various diagrams may depict an example architectural or other configuration for the disclosure, which is done to aid in understanding the features and functionality that can be included in the disclosure. The disclosure is not restricted to the illustrated example architectures or configurations, but can be implemented using a variety of alternative architectures and configurations. Additionally, although the disclosure is described above in terms of various exemplary embodiments and implementations, it should be understood that the various features and functionality described in one or more of the individual embodiments are not limited in their applicability to the particular embodiment with which they are described. They instead can, be applied, alone or in some combination, to one or more of the other embodiments of the disclosure, whether or not such embodiments are described, and whether or not such features are presented as being a part of a described embodiment. Thus the breadth and scope of the present disclosure should not be limited by any of the above-described exemplary embodiments.

In this document, the term "module" as used herein, refers to software, firmware, hardware, and any combination of these elements for performing the associated functions described herein. Additionally, for purpose of discussion, the various modules are described as discrete modules; however, as would be apparent to one of ordinary skill in the art, two or more modules may be combined to form a single module that performs the associated functions according embodiments of the invention.

In this document, the terms "computer program product", "computer-readable medium", and the like, may be used generally to refer to media such as, memory storage devices, or storage unit. These, and other forms of computer-readable media, may be involved in storing one or more instructions for use by processor to cause the processor to perform specified operations. Such instructions, generally referred to as "computer program code" (which may be grouped in the form of computer programs or other groupings), when executed, enable the computing system.

It will be appreciated that, for clarity purposes, the above description has described embodiments of the invention with reference to different functional units and processors. However, it will be apparent that any suitable distribution of functionality between different functional units, processors or domains may be used without detracting from the invention. For example, functionality illustrated to be performed by separate processors or controllers may be performed by the same processor or controller. Hence, references to specific functional units are only to be seen as references to suitable means for providing the described functionality, rather than indicative of a strict logical or physical structure or organization.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; and adjectives such as "conventional," "traditional," "normal," "standard," "known", and terms of similar meaning, should not be construed as limiting the item described to a given time period, or to an item available as of a given time. But instead these terms should be read to encompass conventional, traditional, normal, or standard technologies that may be available, known now, or at any time in the future. Likewise, a group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although items, elements or components of the disclosure may be described or claimed in the singular, the plural is contemplated to be within the scope thereof unless limitation to the singular is explicitly stated. The presence of broadening words and phrases such as "one or more," "at least," "but not limited to", or other like phrases in some instances shall not be read to mean that the narrower case is intended or required in instances where such broadening phrases may be absent.

Additionally, memory or other storage, as well as communication components, may be employed in embodiments of the invention. It will be appreciated that, for clarity purposes, the above description has described embodiments of the invention with reference to different functional units and processors. However, it will be apparent that any suitable distribution of functionality between different functional units, processing logic elements or domains may be used without detracting from the invention. For example, functionality illustrated to be performed by separate processing logic elements, or controllers, may be performed by the same processing logic element, or controller. Hence, references to specific functional units are only to be seen as references to suitable means for providing the described functionality, rather than indicative of a strict logical or physical structure or organization.

Furthermore, although individually listed, a plurality of means, elements or method steps may be implemented by, for example, a single unit or processing logic element. Additionally, although individual features may be included in different claims, these may possibly be advantageously combined. The inclusion in different claims does not imply that a combination of features is not feasible and/or advantageous. Also, the inclusion of a feature in one category of claims does not imply a limitation to this category, but rather the feature may be equally applicable to other claim categories, as appropriate.

What is claimed is:

1. An OFDM communication system comprising:
   a plurality of radio frequency (RF) channels, wherein the RF channels comprise dissimilar bandwidths;
   a transmitter for providing a plurality of OFDM subcarriers and a plurality of OFDM frames each comprising variable length cyclic prefix and a plurality of variable size sub-frames;
   a first processor module, for calculating a fixed subcarrier spacing for the OFDM subcarriers, wherein the fixed subcarrier spacing is chosen such that a number of OFDM subcarriers is variable to utilize any of the RF channels; and
   a second processor module operable to calculate a plurality of timing gaps, wherein each of the timing gaps is associated with at least one of the variable size sub-frames, wherein the timing gaps are calculated based, at least in part, on a duration of at least one of the variable length cyclic prefixes.

2. The OFDM communication system of claim 1, wherein the fixed subcarrier spacing that can divide the allocated bandwidth evenly is chosen to optimize bandwidth efficiency.

3. The OFDM communication system of claim 1, wherein the fixed subcarrier spacing that can divide a channel raster of 200 KHz or 250 KHz evenly is chosen to optimize bandwidth efficiency.

4. The OFDM communication system of claim 1, wherein the fixed subcarrier spacing comprises one of the group consisting of about 10 kHz, 12.5 KHz and multiple of 10 kHz or 12.5 kHz, such as 20 kHz, and 25 KHz.

5. The OFDM communication system of claim 1, wherein the fixed subcarrier spacing comprises 10.9375 kHz or 21.875 kHz.

6. The OFDM communication system of claim 1, wherein the OFDM communication system is an OFDMA communication system.

7. An OFDM communication system comprising a plurality of radio frequency (RF) channels, wherein the RF channels comprise dissimilar bandwidths, the OFDM communication system comprising:
   a transmitter for providing a plurality of OFDM subcarriers and a plurality of OFDM frames each comprising a variable length cyclic prefix and a plurality of variable size sub-frames;

a first processor module for calculating a fixed subcarrier spacing for the OFDM subcarriers, wherein the fixed subcarrier spacing is chosen such that a number of OFDM subcarriers is variable to utilize any of the RF channels, and the fixed subcarrier spacing is calculated from $F_s=\Delta f \times N_{FFT}$, wherein $F_s$ is a sampling frequency, $N_{FFT}$ is a size of a Fast-Fourier Transform, and $\Delta f$ is the fixed subcarrier spacing; and a second processor module operable to provide a flexible radio frame structure comprising a plurality of the variable length cyclic prefixes operable for the RF channels and operable to calculate a plurality of timing gaps, wherein each timing gap of the plurality of timing gaps is associated with at least one of the variable size sub-frames, wherein the timing gaps are calculated based, at least in part, on a duration of at least one of the variable length cyclic prefixes.

8. The OFDM communication system of claim 7, wherein the variable length cyclic prefixes comprise a set of pre-defined cyclic prefix durations for each RF channel.

9. The OFDM communication system of claim 8, wherein the same set of cyclic prefix durations is used for multiple or all RF channels.

10. The OFDM communication system of claim 7, wherein each of the variable length cyclic prefixes can be dynamically selected for each of the RF channels.

11. The OFDM communication system of claim 7, wherein the plurality of OFDM frames each further comprise one of a plurality of data symbols, wherein each of the plurality of OFDM frame comprises a communication signal on one of plurality of RF channels.

12. The OFDM communication system of claim 7, wherein the timing gaps provide protection for timing variations at signal reception.

13. The OFDM communication system of claim 12, wherein the timing gap is placed at the end of a downlink sub-frame.

14. The OFDM communication system of claim 12, wherein the timing gap is placed at the beginning of an uplink sub-frame.

15. The OFDM communication system of claim 13 or 14, wherein the transmit-transition gap (TTG) of a frame is consisted of the timing gap from downlink sub-frame (TTG-DL) plus the timing gap from uplink sub-frame (TTG-UL).

16. The OFDM communication system of claim 11, further comprising a plurality of variable radio frame configurations for transmission through one of the RF channels, wherein the variable radio frame configurations comprise a subset of the variable size sub-frames.

17. The OFDM communication system of claim 7, wherein a set of cyclic prefix durations are chosen based at least in part on a condition of each of the RF channels.

* * * * *